United States Patent

Kumura et al.

[11] Patent Number: 6,018,689
[45] Date of Patent: Jan. 25, 2000

[54] ACTIVE VIBRATION REDUCING APPARATUS AND METHOD FOR IDENTIFYING TRANSFER FUNCTION IN ACTIVE VIBRATION REDUCING APPARATUS

[75] Inventors: Takeshi Kumura, Yokohama; Shigeki Satoh, Kanagawa, both of Japan

[73] Assignee: Nissan Motor Co., Ltd., Kanagawa, Japan

[21] Appl. No.: 08/965,616

[22] Filed: Nov. 6, 1997

[30] Foreign Application Priority Data

Nov. 8, 1996 [JP] Japan .................................. 8-296605

[51] Int. Cl.[7] .......................... G01B 13/00; G05D 22/00; G01M 1/30
[52] U.S. Cl. .......................... 700/280; 700/279; 700/188; 700/191; 702/56; 702/191; 381/71.4; 381/71.7; 381/71.12
[58] Field of Search ..................... 700/279, 280, 700/188, 191, 192; 702/56, 191, 192, 193, 194, 195; 381/71.4, 71.7–9, 71.12, 86

[56] References Cited

U.S. PATENT DOCUMENTS

| | | | |
|---|---|---|---|
| 5,325,437 | 6/1994 | Doi et al. | 381/71 |
| 5,337,365 | 8/1994 | Hamabe et al. | 381/71 |
| 5,384,853 | 1/1995 | Kinoshita et al. | 381/71 |
| 5,416,844 | 5/1995 | Nakaji et al. | 381/71 |
| 5,434,783 | 7/1995 | Pal et al. | 364/424.05 |
| 5,537,435 | 7/1996 | Carney et al. | 375/219 |
| 5,686,774 | 11/1997 | Slavik et al. | 310/198 |
| 5,701,349 | 12/1997 | Sano et al. | 381/71 |
| 5,792,948 | 8/1998 | Aoki et al. | 700/280 |
| 5,910,993 | 6/1999 | Aoki et al. | 381/71.12 |
| 5,950,756 | 9/1999 | Saoth et al. | 180/312 |

FOREIGN PATENT DOCUMENTS 3-259722 11/1991 Japan .
6-332471 12/1994 Japan .

*Primary Examiner*—Paul P. Gordon
*Assistant Examiner*—Ramesh Patel
*Attorney, Agent, or Firm*—McDermott, Will & Emery

[57] ABSTRACT

Described are a vibration actively reducing apparatus and a method for identifying a transfer function in the vibration actively reducing apparatus. An identification signal which is a quantization of at least one sinusoidal wave is supplied from a controller of the vibration actively reducing apparatus to a controlled vibration source in synchronization with a predetermined output sampling clock (SCo) to develop an identification vibration therefrom. The controller reads a residual vibration signal from a residual vibration detector of the actively reducing apparatus in synchronization with a predetermined input sampling clock (SCi). After read of the residual vibration signal as a time series data for each frequency, an FFT calculation is carried out for each time series data to extract a frequency component of the original sinusoidal wave. An inverse FFT calculation is, then, carried out for the result of the synthesis of each extracted frequency component to derive an impulse response as the transfer function.

24 Claims, 10 Drawing Sheets

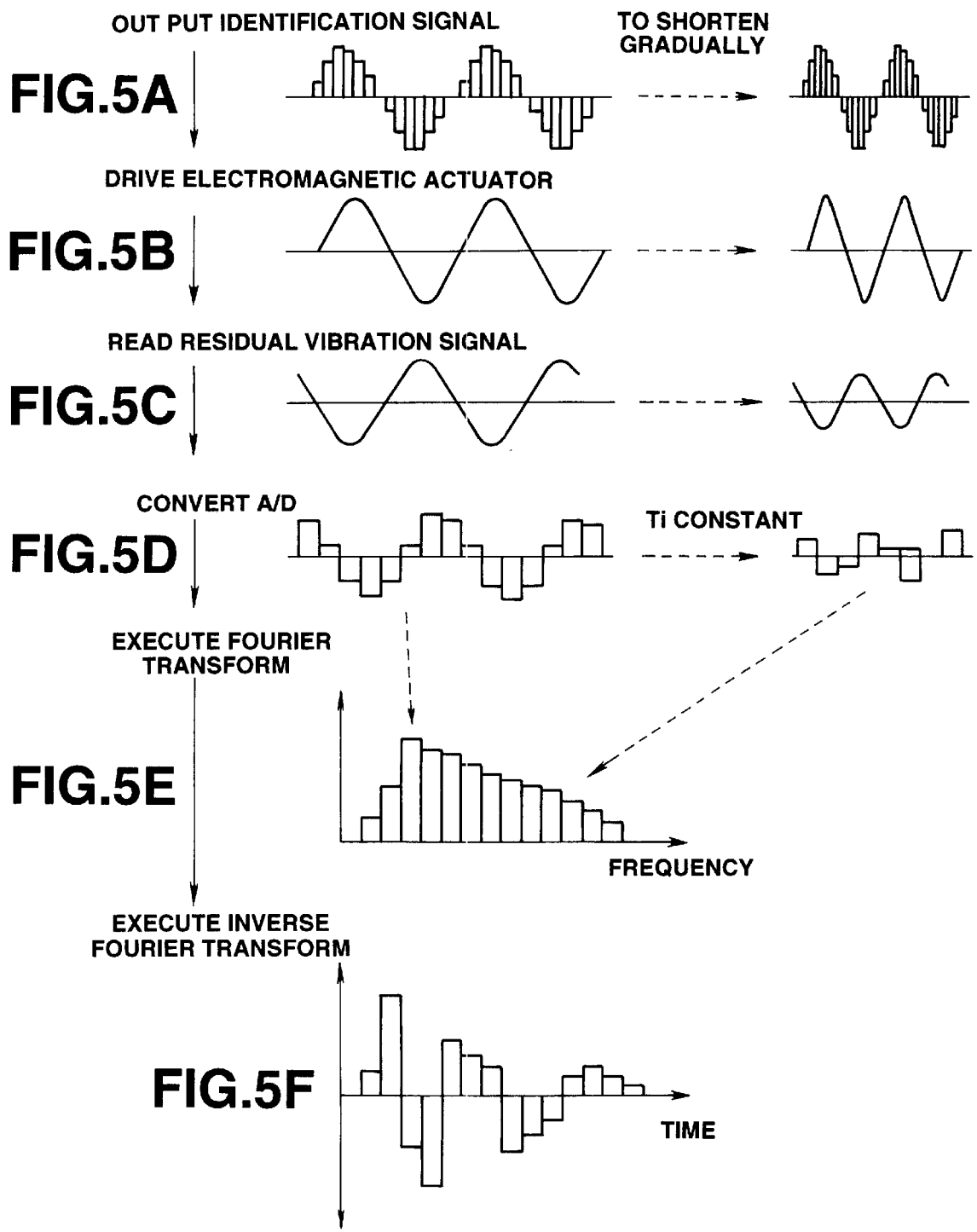

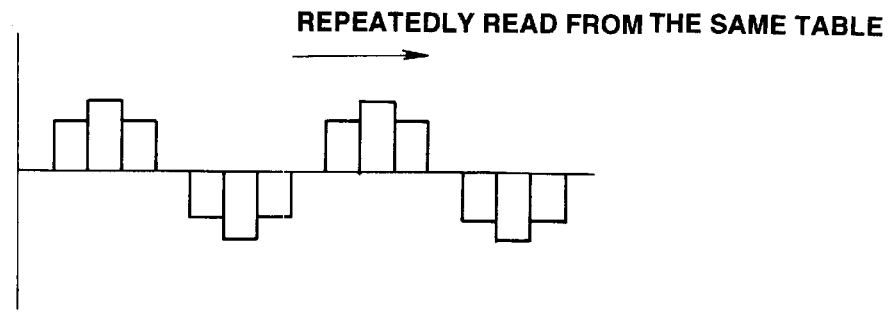
FIG.12A
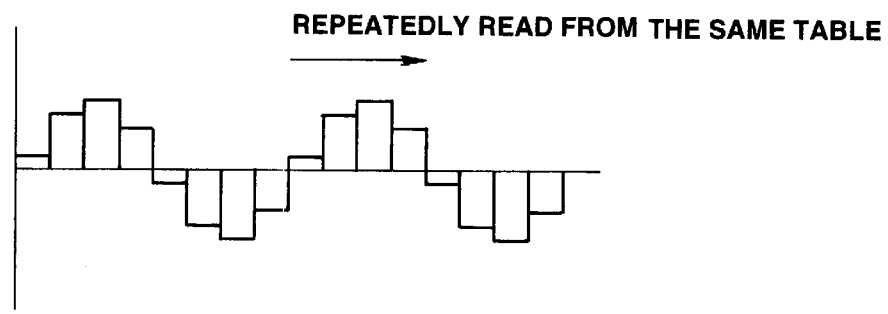
FIG.12B
FIG.14
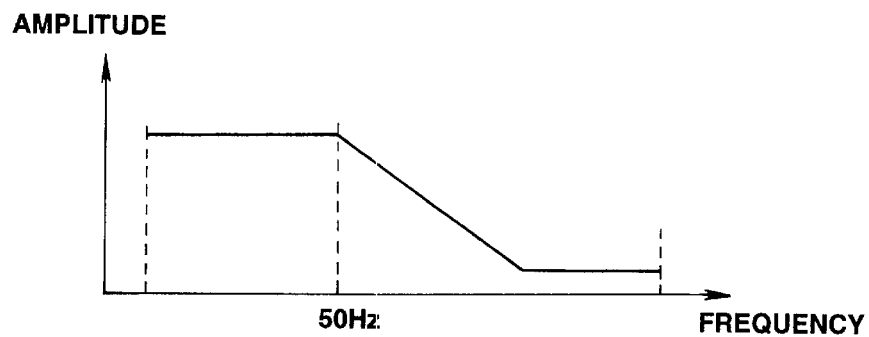

ACTIVE VIBRATION REDUCING APPARATUS AND METHOD FOR IDENTIFYING TRANSFER FUNCTION IN ACTIVE VIBRATION REDUCING APPARATUS

The contents of a Patent Application No. Heisei 8-296605, with a filing date of Nov. 8, 1996 in Japan, are herein incorporated by reference.

BACKGROUND OF THE INVENTION a) Field of the Invention

The present invention relates to apparatus and method for actively reducing a vibration. The present invention particularly relates to the actively vibration reducing apparatus and method in which a controlled vibration developed from a controlled vibration source is interfered against the vibration transmitted from a vibration (developing) source such as a vehicular engine toward a vibration source supporting base such as a vehicular body to reduce the vibration. The present invention, more particularly, relates to the actively vibration reducing apparatus and method in which in a control algorithm to derive the controlled vibration source, the control algorithm including a transfer function established between the controlled vibration source and a detector for detecting a residual vibration after the interference of the controlled vibration against the vibration, the transfer function can be calculated and identified in a very short period of time with a high accuracy without use of a processor capable of calculating and processing complicated calculation equations nor use of a high-capacity memory.

b) Description of the Related Art

In such an actively vibration reducing apparatus as described above, the transfer function between the controlled vibration source and residual vibration detector is minutely different for each product due to its characteristic deviation in an equipment to which the actively vibration reducing apparatus is applied or in an installation to which the actively vibration reducing apparatus is applied. In addition, the above-described transfer function tends to be varied from an originally set state thereof due to a characteristic variation in time along with a use of the actively vibration reducing apparatus in the applied equipment.

Hence, it is desirable to identify the transfer function after the actively vibration reducing apparatus has been incorporated into the applied apparatus or identify the transfer function for each regular checking performed for the applied apparatus in order to execute a vibration reduction control with the high accuracy.

A Japanese Patent Application First Publication No. Heisei 6-332471 published on Dec. 2, 1994 exemplifies a first previously proposed actively noise or vibration reducing apparatus in which the transfer function is identified.

In the first previously proposed actively (vibration or noise) reducing apparatus disclosed in the above-identified Japanese Patent Application First Publication, an identification sound or identification vibration is developed in accordance with an impulse signal from a controlled sound source or the controlled vibration source and its (impulse) response is measured by means of a residual sound detector or residual vibration detector so that the transfer function described above required in the control algorithm of the actively noise or vibration reducing apparatus is identified.

In addition, a timing at which the identification sound or identification vibration in accordance with the impulse signal is developed is limited to a time immediately before a state in which no noise or vibration is developed from a noise source or the vibration source is transferred to that in which it is developed. Hence, the identification of the transfer function can be performed without remarkable increase in a calculation load and without unpleasant feeling given to a listener or user in the identification sound or vibration environment.

Another Japanese Patent Application First Publication No. Heisei 3-259722 published on Nov. 19, 1991 exemplifies a second previously proposed noise reducing apparatus in which a noise developed by a compressor of a refrigerator and irradiated externally from a duct of a machine room is canceled before the noise is irradiated from the duct. In the second previously proposed actively noise reducing apparatus disclosed in the above-identified Japanese Patent Application First Publication, loud speaker and microphone are installed in the duct and a controlled sound is developed from the loud speaker according to a driven state of the microphone so as to carry out the noise reduction.

In addition, in order to prevent a noise control characteristic in the second previously proposed actively noise reducing apparatus from being deteriorated, the identification sound in accordance with a white noise is developed to measure a transfer function established between the loud speaker and the microphone so as to identify a digital filter in a controller of the second previously proposed noise reducing apparatus.

SUMMARY OF THE INVENTION

Since it is possible for each apparatus for actively reducing the vibration or noise applied to the equipment or installation to identify the transfer function required for the vibration reduction control, a highly accurate control of the vibration reduction can be expected.

However, it is necessary to develop the identification sound in accordance with the impulse signal or the white noise signal in order to identify the transfer function.

The impulse signal and white noise signal are signals including components over all frequency bands.

Hence, output amplitudes are dispersed over a wide frequency band even if the identification sound is developed. Accordingly, unless all output amplitudes of the identification sound are sufficiently high, a slight output amplitude for each frequency component is resulted so that an insufficient identification of the transfer function is made. Hence, in order to achieve a sufficient level of output for each frequency band, it is demanded to develop a high output of the identification sound. To cope with the above-described demand, it is easy to apply the above-described demand to the actively noise reducing apparatus having the loud speaker as the controlled sound source for the loud speaker capable of providing a large power of the output therefrom. Hence, the above-described equipment can easily be achieved in the actively noise reducing apparatus.

However, in the case of the actively vibration reducing apparatus in which, for example, the vibration transmitted from the vehicular engine toward the vehicular body is reduced by developing an active supporting force on an engine mount interposed between the vehicular engine and the vehicular body, there is a limit in the active supporting force that the engine mount can develop. Due to this fact, even if a large impulse signal or large white noise signal is supplied to the engine mount as the controlled vibration source, a level of the actively developed identification sound (vibration) is not so high. Then, it takes a lot of time to identify the transfer function.

In addition, when the actively vibration reducing apparatus is actually applied to the engine mount in which the vehicular engine is the vibration source, such a vibration as that over all frequency bands as the white noise signal does not occur but it generally occurs that the vibration whose frequency band is concentrated to a particular frequency is developed.

Hence, it is often the case that the identification sound developed in accordance with the white noise signal or so forth cannot identify the transfer function suitably to an actual use condition.

Furthermore, suppose a situation such that an identification operation is actually carried out.

For example, if the actively vibration reducing apparatus applicable to the automotive vehicle receives the identification operation, it becomes necessary to identify the transfer function using a controller actually mounted in the vehicle in order to identify the transfer function for each vehicle in which the corresponding one of the actively vibration reducing apparatuses is mounted in a manufacturing line of an automotive vehicle factory and a time required to identify the transfer function needs to be finished in a time as short as possible so as not to largely affect a manufacturing line speed of the factory. In other words, the identification of the transfer function for each vehicle needs to be carried out in a limited time duration using a relatively low capability controller mounted in each vehicle as is different from an identification calculation to be carried out in a sufficient time margin using a high-capability processor and large-capacity memory mounted computer in a case of an experimental purpose.

It is therefore an object of the present invention to provide apparatus and method for actively reducing the vibration which can calculate the transfer function required for the vibration reduction control in a very short period of time and with a high accuracy without use of a controller capable of processing the complicated calculations and without use of a large capacity memory.

The above-described object can be achieved by providing an apparatus for actively reducing a vibration, comprising: a vibration developing source; a controlled vibration source arranged so as to be enabled to develop a controlled vibration to be interfered against the vibration developed from the vibration developing source; a reference signal generator for detecting a vibration developed condition of the vibration developing source and generating and outputting the detected vibration developed condition as a reference signal; a residual vibration detector for detecting a residual vibration after the interference of the controlled vibration against the vibration developed from the vibration developing source; a controller for driving the controlled vibration source to reduce the vibration developed from the vibration developing source using a control algorithm including a transfer function established between the controlled vibration source and the residual vibration detector on the basis of the reference signal and the residual vibration signal; an identification signal supplier for sequentially supplying individual discrete values of an identification signal which is a quantization of a time-continuous sinusoidal wave equally divided by a predetermined number to the controlled vibration source in synchronization with a predetermined output sampling clock; a response signal reader for reading the residual vibration signal in synchronization with a predetermined input sampling clock when an identification vibration responding to the identification signal is developed from the controlled vibration source; a transfer function identifier for identifying the transfer function included in the control algorithm on the basis of the residual vibration signal read by the response signal reader; and a period setter capable of setting individually and independently periods of the predetermined output and input sampling clocks.

The above-described object can also be achieved by providing an apparatus for actively reducing a vibration, comprising: vibration developing source means; controlled vibration source means arranged so as to be enabled to develop a controlled vibration to be interfered against the vibration developed from the vibration developing source means; reference signal generating means for detecting a vibration developed condition of the vibration developing source means and generating and outputting the detected vibration developed condition as a reference signal; residual vibration detecting means for detecting a residual vibration after the interference of the controlled vibration against the vibration developed from the vibration developing source means; controlling means for driving the controlled vibration source means to reduce the vibration developed from the vibration developing source means using a control algorithm including a transfer function established between the controlled vibration source means and the residual vibration detecting means on the basis of the reference signal and the residual vibration signal; identification signal supplying means for sequentially supplying individual discrete values of an identification signal which is a quantization of a time-continuous sinusoidal wave equally divided by a predetermined number to the controlled vibration source in synchronization with a predetermined output sampling clock; response signal reading means for reading the residual vibration signal in synchronization with a predetermined input sampling clock when an identification vibration responding to the identification signal is developed from the controlled vibration source means; transfer function identifying means for identifying the transfer function included in the control algorithm on the basis of the residual vibration signal read by the response signal reading means; and period setting means capable of setting individually and independently periods of the predetermined output and input sampling clocks.

The above-described object can also be achieved by providing A method for identifying a transfer function in a vibration actively reducing apparatus, the vibration actively reducing apparatus comprising: a vibration developing source; a controlled vibration source arranged so as to be enabled to develop a controlled vibration to be interfered against the vibration developed from the vibration developing source; a reference signal generator for detecting a vibration developed condition of the vibration developing source and generating and outputting the detected vibration developed condition as a reference signal; a residual vibration detector for detecting a residual vibration after the interference of the controlled vibration against the vibration developed from the vibration developing source; and a controller for driving the controlled vibration source to reduce the vibration developed from the vibration developing source using a control algorithm including a transfer function established between the controlled vibration source and the residual vibration detector on the basis of the reference signal and the residual vibration signal, the method comprising the steps of: a) setting individually and independently periods of predetermined output and input sampling clocks; b) sequentially supplying individual discrete values of an identification signal which is a quantization of a time-continuous sinusoidal wave equally divided by a predetermined number to the controlled vibration source in synchronization with the predetermined output sampling clock; c) reading the residual vibration signal in synchronization with the predetermined input sampling clock when an identification vibration responding to the identification signal is developed from the controlled vibration source; and d) identifying the transfer function included in the control algorithm on the basis of the residual vibration signal read at the step c).

BRIEF DESCRIPTION OF THE DRAWINGS

FIGS. 5A, 5B, 5C, 5D, 5, and 5F are waveform charts for explaining a whole flow of the identification processing of the transfer function.

FIGS. 12A and 12B are examples of an actual identification signal.

FIG. 14 is a graph for explaining a relationship between a frequency and an amplitude of the sinusoidal wave used for the identification signal.

BEST MODE FOR CARRYING OUT THE INVENTION

Reference will hereinafter be made in order to facilitate a better understanding of the present invention.

First Embodiment

FIGS. 1A through 8 show a first preferred embodiment of an apparatus for actively reducing a vibration according to the present invention which is applicable to an automotive vehicle.

Figure 1A:
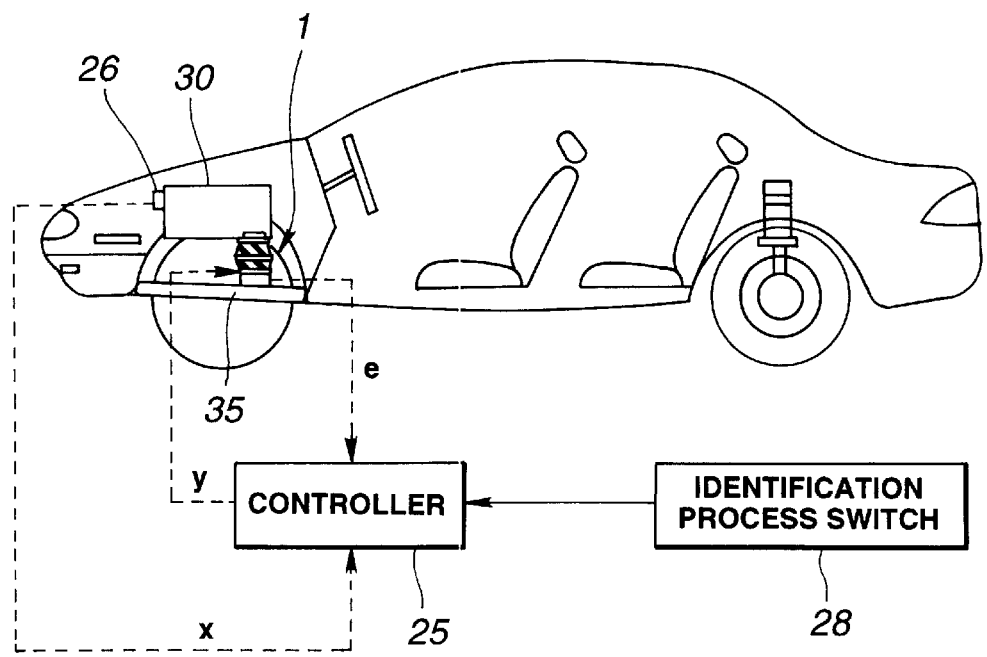
FIG. 1A is a schematic drawing of an automotive vehicle to which a first preferred embodiment of an apparatus for actively reducing a vibration according to the present invention is applicable.

As shown in FIG. 1A, a vehicular engine 30 is supported on a vehicular body 35 constituted by a suspension member via an active engine mount 1 which is capable of developing an active supporting force according to a drive signal (the drive signal will be described later).

It is noted that, in an actual practice, in addition to the active engine mount 1, a plurality of passive engine mounts are interposed between the vehicular engine 30 and the vehicle body 35, the passive engine mounts being capable of developing passive supporting forces in accordance with relative displacements thereof between the vehicular engine 30 and vehicular body 35.

The passive engine mounts include, for example, normal-type engine mounts supporting a load using elastic bodies made of rubbers, and/or fluid-sealed type mount insulators in which fluid is sealed so as to enable developments of damping forces within internals of the elastic bodies made of the rubbers. Each passive engine mount is exemplified by a U.S. Pat. No. 5,439,204 (the disclosure of which is herein incorporated by reference).

Figure 2:
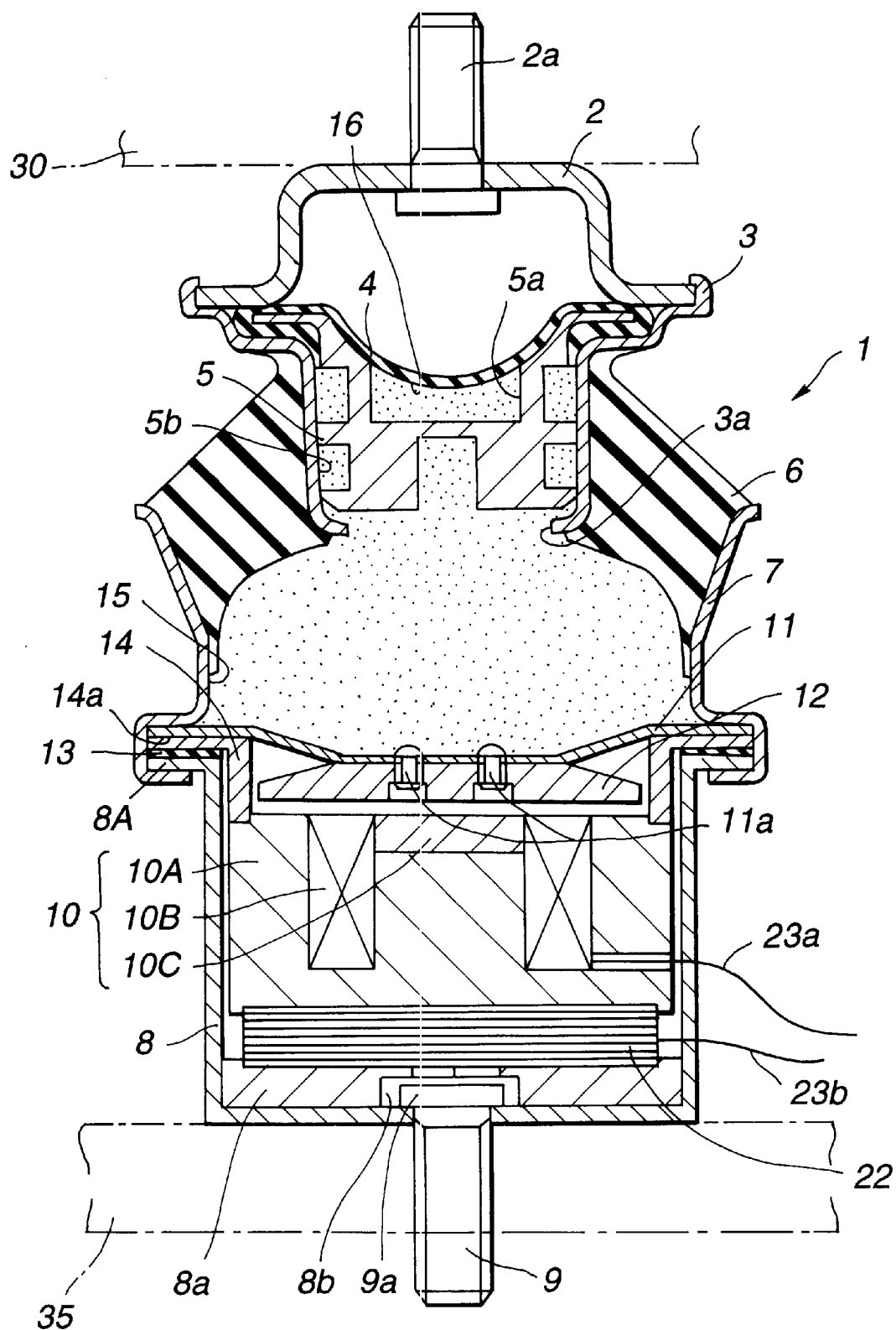
FIG. 2 is a cross sectional view of an example of an engine mount shown in FIG. 1A.

FIG. 2 shows an example of the active engine mount 1 shown in FIG. 1A.

The active engine mount 1 includes: a bell-shaped encapsulation 2 having a bolt 2a integrated onto an upper part thereof for mounting the encapsulation 2 onto the vehicular engine 30, having a cavity into an internal side thereof, and having an opening at a lower part thereof. An outside surface of the lower part of the encapsulation 2 is caulked to an upper end of an inner envelope 3 whose axis is faced vertically as viewed from FIG. 2.

The inner envelope 3 is formed such that a diameter thereof at a lower end is shorter than that at an upper end thereof. Its lower end thereof is bent inwardly and horizontally so that an opening 3a is formed thereat. A diaphragm 4 is disposed whose end is inserted into a caulked portion between the encapsulation 2 and inner envelope 3 so as to partition an inner space of the encapsulation 2 and the inner envelope 3 into two. An upper space with respect to the diaphragm 4 is exposed to the atmospheric pressure via a hole (not shown) provided on a side surface of the encapsulation 2.

An orifice constituting member 5 is disposed within the inner side of the inner envelope 3. It is noted that, in the first embodiment, a membrane-shaped elastic body (may be an extended portion of an outer peripheral portion of the diaphragm 4) is interposed between the inner surface of the inner envelope 3 and orifice constituting member so that the orifice constituting member 5 so that the orifice constituting member 5 is tightly fitted onto the inner side of the inner envelope 3.

The orifice constituting member 5 is matched with the inner space of the inner envelope 3 so as to form approximately cylindrically.

A circular recess 5a is formed on the upper surface.

An orifice 5b provides means for communicating between the recess 5a and a portion of the orifice constituting member 5 faced against the opening 3a at the bottom surface of the inner envelope 3.

The orifice 5b includes: for example, a groove extended approximately spirally along an outer peripheral surface of the orifice constituting member 5, a flow passage communicating one end of the groove with the recess 5a; and a flow passage for communicating the other end of the groove with the opening 3a.

An inner surface of the inner envelope 3 is adhered onto an inner peripheral surface of a supporting elastic body 6 having a wall thickness in an approximately cylindrical form under a vulcanization. An inner peripheral surface of the inner envelope 3 is raised slightly upwardly. An outer peripheral surface of the supporting elastic body 6 is adhered onto an upper part of an inner peripheral surface of an outer envelope 7. A diameter of the outer envelope 7 at an upper part thereof is longer than that thereof at a lower part thereof.

An actuator casing 8 is formed in an approximately cylindrical shape having an opening at an upper surface thereof. A lower end of the outer envelope 7 is caulked onto an upper end of the actuator casing 8. A mounting bolt 9 is projected from a lower end surface of the actuator casing 8 on the vehicle body 35 (supporting base). The mounting bolt 9 has its head 9a housed in a cavity portion 8b located at a center of a plate-like member 8a disposed so as to extend over an inner bottom surface of the actuator casing 8.

Furthermore, an electromagnetic actuator 10 is disposed in an inner side of the actuator casing 8. The electromagnetic actuator 10 includes: a cylindrical iron-made yoke 10A; an excitation coil 10B with its axis faced vertically; and a permanent magnet 10C having magnetic pole surfaces and which is fixed on an upper surface of the center portion of the yoke 10A on which the excitation coil 10B is wound.

A flange portion 8A is formed on an upper end of the actuator casing 8. A peripheral edge of a circular metallic plate spring 11 is inserted into the caulked portion, a magnetizable magnetic path member 12 being fixed by means of a rivet 11a onto a center part of the plate spring 11. It is noted that the magnetic path member 12 is an iron-made disc plate having a slightly smaller diameter than that of the yoke 10A and having a thickness such that its bottom surface approaches to the electromagnetic actuator 10.

Furthermore, a ring-shaped membrane elastic member 13 and a flange portion 14a of a force transmitting rigidity member 14 are supported on the caulked portion so as to be inserted into the flange 8A and the plate spring 11.

Specifically, the membrane-shaped elastic body 13, the flange portion 14a of the force transmitting rigidity member 14, and the plate spring 11 are sequentially overlapped in this sequence on the flange 8A of the actuator casing 8. The whole overlapped portion is integrally caulked to the lower end of the outer envelope 7.

The force transmitting rigidity member 14 is a short cylindrical member enclosing the magnetic path member 12. A flange 14a is formed on its upper end of the force transmitting rigidity member 14. A lower end of the force transmitting rigidity member 14 is coupled onto an upper surface of the yoke 10A constituting the electromagnetic actuator 10. Specifically, a lower end of the force transmitting rigidity member 14 is fitted into a circular groove formed along a peripheral edge of an upper end surface of the yoke 10A so as to be coupled together. It is noted that a spring constant of the force transmitting member 14 during an elastic deformation thereof is set to be larger than the spring constant of the membrane-shaped elastic body 13.

In the first embodiment, a fluid member 15 is formed at a portion defined by a lower surface of the supporting elastic body 6 and an upper surface of the plate spring 11. A sub fluid chamber 16 is formed at a portion defined by the diaphragm 4 and recess 5a. The orifice 5b formed by the orifice constituting member 5 provides means for communicating between the fluid chamber 15 and the sub fluid chamber 16. A fluid such as oil is sealed within the fluid chamber 15, the sub fluid chamber 16, and the orifice 5b. A characteristic as a fluid mount determined according to a fluid path formation of the orifice 5b is adjusted to indicate a high dynamic spring constant and/or a high damping force when an engine shake occurs during a run of the vehicle, in other words, while the active engine mount 1 is vibrated over a frequency range from 5 Hz to 15 Hz.

The excitation coil 10B of the electromagnetic actuator 10 is so designed as to develop a predetermined electromagnetic force in response to the drive signal y supplied in a current form from a controller 25 via a wire harness 23a.

Figure 1B:
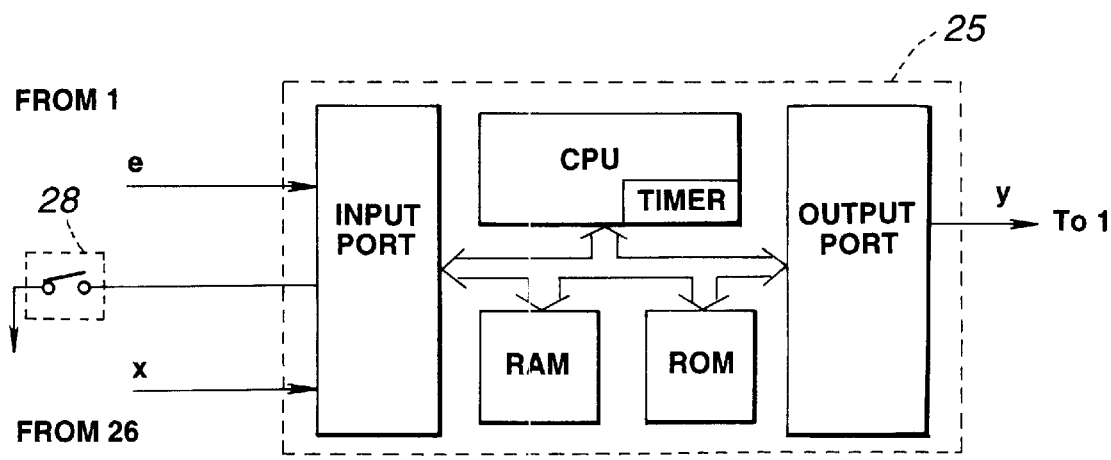
FIG. 1B is a circuit block diagram of a controller shown in FIG. 1A.

Referring to FIG. 1B, the controller 25 is constituted by a microcomputer having a CPU (Central Processing Unit), a ROM (Read Only Memory), a RAM (Random Access Memory), an Input interface, an Output interface, the Input and Output interfaces including an amplifier (,e.g., voltage follower), an Analog-to-Digital Converter, and a Digital-to-analog converter. In a case wherein an idling vibration, enclosed sound vibration, or an acceleration vibration (a vibration developed when the vehicle is accelerated) is inputted to the vehicle body 35, the drive signal y is developed and outputted to the active engine mount 1 so as to develop the active supporting force which can reduce the vibration caused by the above-described engine individual vibrations.

The idling vibration and enclosed sound vibration are mainly caused by, for example, a second-order component of an engine revolution in a case of a reciprocating, four-stroke, four-cylinder engine, the engine vibration in the second-order component of the engine revolution being transmitted toward the vehicle body 35.

It is, hence, possible to reduce the vibration at the side of the vehicle body 35 if the drive signal y in synchronization with the second-order component of the engine revolution. Hence, in the first embodiment, a pulse signal generator 26 is installed which is synchronized with the revolution of a crankshaft of the engine 30 (for example, one whenever the crankshaft has revolved through 180° in the case of the reciprocating, four-stroke, four-cylinder engine). The reference signal x is supplied to the controller 25 as a signal representing a developed condition of the vibration in the engine 30.

A load sensor 22 for detecting a vibration force transmitted from the vehicular engine 30 toward the supporting elastic body 6 is disposed so as to be inserted between a lower end surface of the yoke 10A of the electromagnetic actuator 10 and an upper surface of a flat plate member 8a to form a bottom surface of the actuator casing 8. A result of detection by means of the load sensor 22 is supplied to the controller 25 in a form of a residual vibration signal e via a wire harness 23b. The load sensor 22 is constituted by, for example, a piezoelectric device, a magnetostrictive device, or a strain gauge.

The controller 25 executes a synchronous-type Filtered-X LMS (Least Mean Square) algorithm which is one of sequentially updating type adaptive algorithms on the basis of the supplied residual vibration signal e and the reference signal x. Consequently, the controller 25 is functionally provided with an adaptive digital filter W whose filter coefficients Wi (i=0, 1, 2, - - - , I−1: I denotes a number of taps of the digital filter) are variable.

At an interval of predetermined sampling clocks when the latest reference signal x is inputted to the controller 25, the filter coefficients Wi of the adaptive digital filter W are sequentially outputted as the drive signal y. At the same time, the filter coefficients Wi of the adaptive digital filter W are appropriately updated on the basis of the reference signal x and the residual vibration signal e.

The updating equation of the adaptive digital filters W will be described in the following equation (1) in accordance with the Filtered-X LMS algorithm.

$$W_i(n+1) = W_i(n) - \mu R^T e(n) \quad (1)$$

In the equation (1), a term attached with (n) or (n+1) denotes a value at one of the sampling time at (n) or (n+1) and $\mu$ denotes a convergence coefficient.

In addition, an updating reference signal RT is, theoretically, a value filtered by a transfer function filter $C\hat{\,}$ such that a transfer function C established between the electromagnetic actuator 10 of the active engine mount 1 and the load sensor 22 is modeled in a finite impulse response type filter. Since a level of the active reference signal x is at a "1", a the term of $R^T$ coincides with the impulse responses of the transfer function filter $C\hat{\,}$ are sequentially generated in synchronization with the reference signal x.

Theoretically, the drive signal y is developed with the reference signal x filtered by means of the adaptive digital filter W. Then, since the level of the active reference signal x is at the "1", the same result as the result of the filtering being the drive signal y is obtained even though the filter coefficient Wi is sequentially outputted in the form of the drive signal y.

Furthermore, the controller 25 executes the vibration reduction processing using the adaptive digital filter W and executes an identification processing for the transfer function C required for the vibration reduction control.

To execute the latter identification processing, an identification processing start (trigger) switch 28 is connected to the controller 25 to be turned to ON to start the identification processing for the transfer function C. For example, when, at a final process of manufacturing the vehicle, or during a regular check by an automotive vehicle sales dealer, an operator turns the identification process start switch 28 to ON, the identification processing for the transfer function C within the controller 25 shown in FIG. 1B is started. It is noted that while the identification processing is executed for the transfer function C, the normal vibration reduction processing is not executed.

In details, the controller 25 executes the vibration reduction processing in accordance with the synchronous type Filtered-X LMS (Least Mean Square) algorithm while the vehicle is running with a vehicular ignition key switch turned on. However, when the identification processing start switch 28 is turned to ON (becomes active), the controller 25 halts the vibration reduction processing but executes the identification processing of the transfer function C.

The controller 25 is provided with a non-volatile memory (normally ROM shown in FIG. 1B) in which each of sequences such that a sinusoidal wave per period is digitalized into a predetermined discrete number (for example, eight ($2^3$) or sixteen ($2^4$)) is stored. The CPU of the controller 25 reads and outputs sequentially each one of numerical values of the corresponding one of the sequences stored in synchronization with the output sampling clock SCo (at an interval of the period To of the output sampling clock SCo in the form of an identification signal to the electromagnetic actuator 10 of the active engine mount 1 so as to develop an identification vibration in the active engine mount 1. The developed identification vibration is detected by means of the load sensor 22 as the residual vibration signal e.

Furthermore, the controller 25 converts the residual vibration signal e in the form of an analog signal which is the result of the identification vibration into a digital value in synchronization with the input sampling clock SCi (that is to say, at an interval of a period Ti of the input sampling clock SCi) and fetches the digital value thereinto.

The CPU of the controller 25 carries out a Fourier transform (,e. g., a Fast Fourier Transform (FFT)) for the fetched residual vibration signal e in synchronization with the input sampling clock SCi so as to extract a component corresponding to a frequency of the identification signal outputted in synchronization with the output sampling clock SCo.

The controller 25 executes the frequency component extracting process described above for a plurality of identification signals having different frequencies by gradually varying each frequency of the identification signals with the period To of the output sampling clock SCo exchanged (for example, with the period To gradually shortened).

Then, the controller 25 synthesizes the components for the respective frequencies and carries out an inverse Fourier Transform for the synthesized result to determine an impulse response corresponding to the transfer function C.

The determined impulse response is updated to the previously determined transfer function filter $C\hat{\,}$ as a finite impulse response type transfer function $C\hat{\,}$.

Next, an operation of the actively vibration reducing apparatus in the first embodiment will be described below.

When the engine shake occurs, the active engine mount 1 functions as a supporting device having the high dynamic spring constant and the high damping force since the flow passage formation of the orifice 5a has properly been selected. Hence, the engine shake developed on the vehicular engine 30 is damped by means of the active engine mount 1 and the vibration level on the vehicle body side 35 is accordingly reduced. It is not necessary to displace positively the movable plate 12 against the engine shake.

In a case where the vibration having the frequency equal to or higher than the engine idling vibration frequency such that the fluid within the orifice 5a becomes sticky and it becomes impossible for the communication of the fluid between the fluid chamber 15 and the sub fluid chamber 16 is inputted, the controller 25 executes a predetermined arithmetic and/or logic operation and outputs the drive signal y to the electromagnetic actuator 10, and develops the active supporting force capable of reducing the vibration on the active engine mount 1.

The above-described predetermined arithmetic and/or logic operation executed in the controller 25 during the input of the engine idling vibration or of the enclosed sound vibration will be described with reference to FIG. 3.

Figure 3:
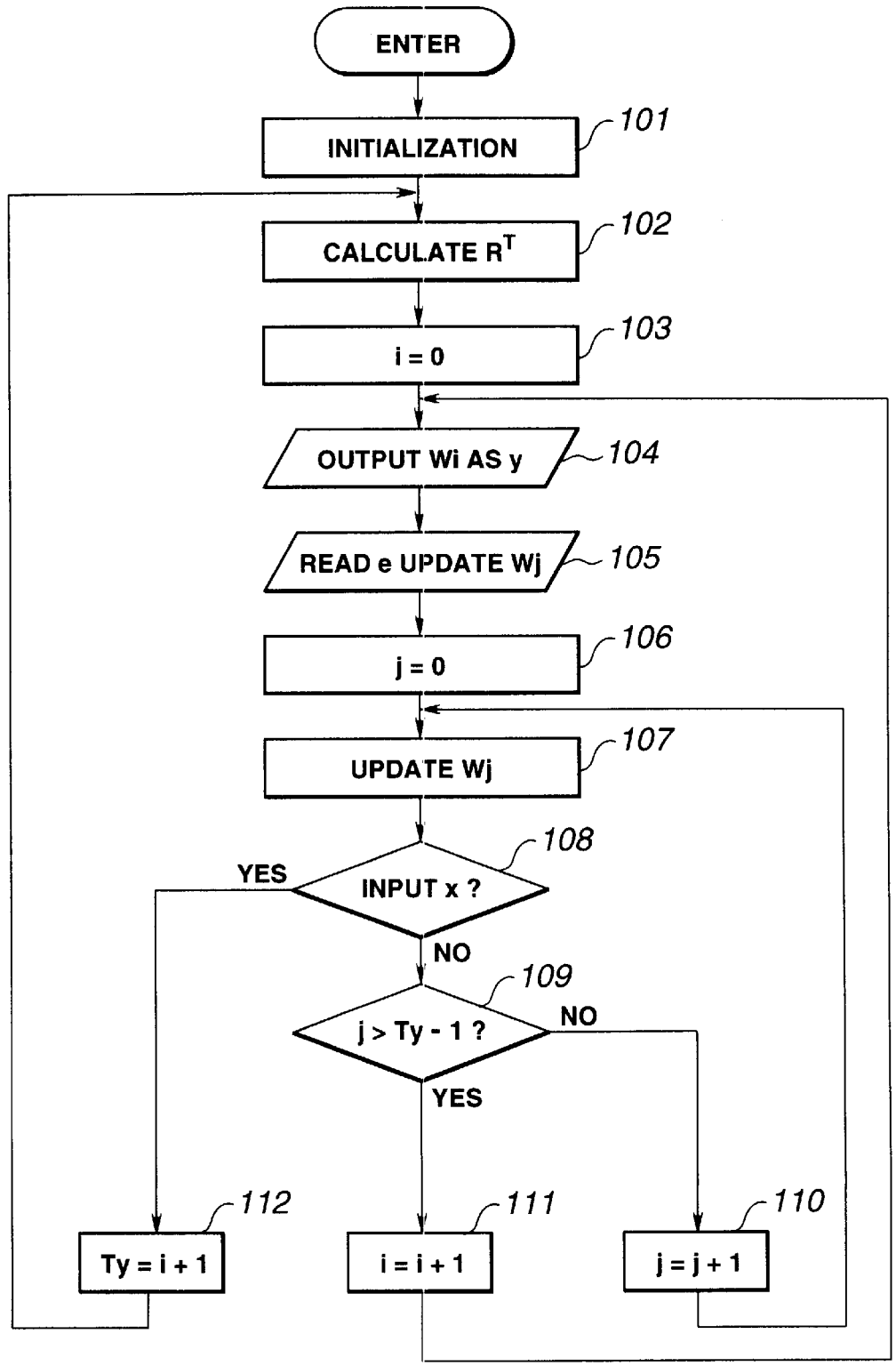
FIG. 3 is an operational flowchart executed in the controller for explaining a vibration reduction processing executed he controller shown in FIG. 1A and FIG. 1B.

FIG. 3 shows a flowchart of the vibration reduction control executed in the controller 25 shown in FIG. 1A.

It is noted that the enclosed sound vibration means a kind of vibration such that the engine 30 is revolved from a low speed toward a high speed during the vehicle started to run and the engine vibration is sounded on a vehicular compartment.

At a first step 101, a predetermined initialization is executed. Then, the routine goes to a step 102. At the step 102, the updating reference signal $R^T$ is calculated on the basis of the transfer function filter $C\hat{\,}$. At the step 102, the updating reference signal $R^T$ per period is totally calculated.

At a step 103, the CPU of the controller 25 is cleared to zero a counter i.

Thereafter, the routine goes to a step 104 in which a filter coefficient Wi of the i-th number in the adaptive digital filter W is outputted as the drive signal y.

At a step 104, the CPU of the controller 25 outputs the drive signal y.

At a step 105, the CPU of the controller 25 reads the residual vibration signal e.

At a step 106, another counter j is cleared to zero and the routine goes to a step 107. The filter coefficient Wj of the j-th number in the adaptive digital filter W is updated in accordance with the equation (1).

Upon the completion of the updating processing at the step 107, the routine goes to a step 108 in which the CPU of the controller 25 determines whether the subsequent reference signal x is inputted. If no subsequent reference signal x is inputted, the routine goes to a step 109 in order to execute an updating of the subsequent filter coefficient of the adaptive digital filter or to execute the output processing of the drive signal y.

At a step 109, the CPU of the controller 25 determines whether the counter j has reached to the number of times Ty (Accurately, a value of the output number of times Ty subtracted by one in order to start the counter j from zero (j>Ty−1). This determination is based on whether the filter coefficients Wi of the adaptive digital filter W are updated by the number required as the drive signal y after the filter coefficient Wi of the adaptive digital filter W is outputted as the drive signal y. If No at the step 109, the routine goes to a step 110 in which the counter j is incremented (j=j+1) and, thereafter, the routine returns to the step 107 in which the above-described processing is repeated.

However, if "Yes" at the step 109, the routine goes to a step 112 in which the counter i (More accurately, a value of the counter i added by one in order to start the counter i from zero) is stored ad the latest output number of times Ty. Then, the routine returns to the step 102 in which the above-described processing is repeated and executed.

After the processing of FIG. 3 is repeatedly executed, the filter coefficients Wi of the adaptive digital filter are sequentially supplied to the electromagnetic actuator 10 as the drive signal y at the interval of the sampling clock from a time point at which the reference signal x is inputted.

As a result of this, although the magnetic force according to the drive signal y is developed on the excitation coil 10B, a constant magnetic force is given from the permanent magnet 10C to the magnetic path member 12 so that the magnetic force by means of the excitation coil 10B may be acted upon the magnetic force on the permanent magnet 10C so as to strengthen or weaken the magnetic force on the permanent magnet 10C. When no drive signal y is supplied to the excitation coil 10B, the magnetic path member 12 is displaced at a neutral position at which the supporting force by means of the spring force 11 is balanced to the magnetic force of the permanent magnet 10C. In this neutral state, when the drive signal y is supplied to the excitation coil 10B, the magnetic force developed on the excitation coil 10B is opposite to the magnetic force of the permanent magnet 10C. At this time, the magnetic path member 12 is displaced in the direction such that the clearance against the electromagnetic actuator 10 is incremented. On the contrary, if the direction of the magnetic force developed on the excitation coil 10B is the same as that of the magnetic force of the permanent magnet 10C, the magnetic path member 12 is displaced in a direction such that the clearance against the electromagnetic actuator 10 is decreased.

Since the magnetic path member 12 is displaceable in both normal and reverse directions, the volume of the (main) fluid chamber 15 is varied if the magnetic path member 12 is displaced. Since the vibration in the volume causes an expansion spring of the supporting elastic body 6 due to its volume variation to the varied, the active supporting force in both of the normal and reverse directions is developed on the active engine mount 1.

Each filter coefficient Wi of the adaptive digital filter W which serves as the drive signal y is sequentially updated using the above equation (1) in accordance with the synchronous-type Filtered-X LMS algorithm. Hence, after each filter coefficient Wi of the adaptive digital filter W is converged into an optimum value upon an elapse of a certain period of time, the drive signal y is supplied to the active engine mount 1. Consequently, the idling vibration and/or enclosed sound vibration transmitted from the engine 30 toward the active engine mount 1 can be reduced.

Figure 4:
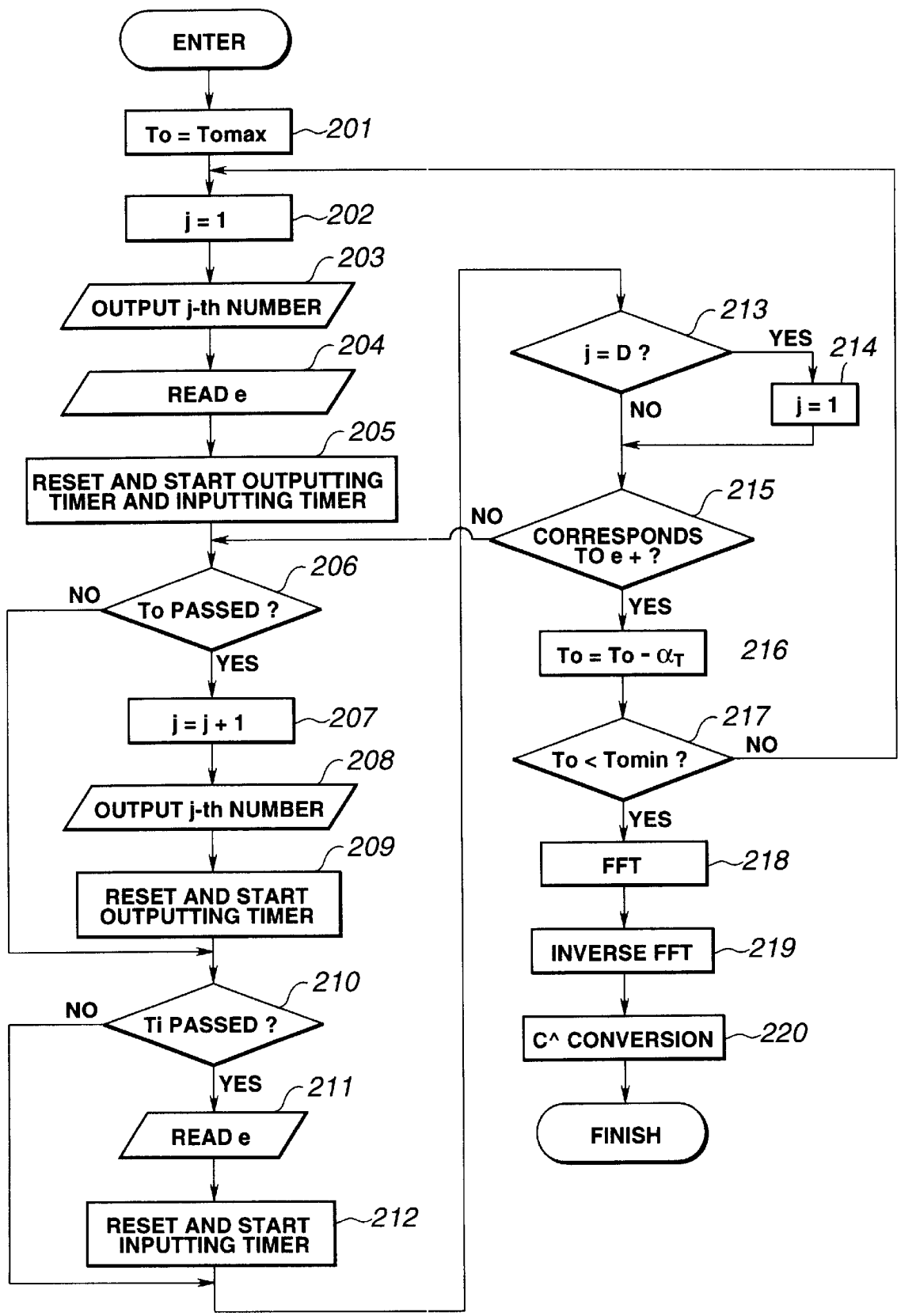
FIG. 4 is an operational flowchart executed in the controller for explaining an identification processing of a transfer function

The operation of the vibration reduction processing to be executed during the vehicular run has been described above. On the other hand, the identification process of the transfer function C as shown in FIG. 4 is executed in the final process in the manufacturing process before the vehicle is under shipment when the operator turns the identification process start switch 28 to ON.

That is to say, at a fist step 201, when the identification process start switch 28 is turned to ON, a period To of the output sampling clock SCo is set to its maximum value Tomax. It is noted that the maximum value Tomax is a division of the period of a vibration having a lowest frequency from among the vibrations to be an object of the vibration control by D (the value of divisions of the sinusoidal wave, namely, the number of the above-described sequences to be outputted as the identification signal). For example, if the lowest frequency of the vibration to be reduced is 5 Hz and the number of divisions of the above-described sequence D is 8, the maximum value Tomax= (⅕)/8 second.

Next, at a step 202, the CPU of the controller 25 sets a counter variable j to 1 and the routine goes to a step 203.

At the step 203, the CPU of the controller 25 outputs the numerical value of the j-th number of the sequence (,i.e., the first numerical value of the sequence) to the electromagnetic actuator 10 of the active engine mount 1 as the identification signal.

At a step 204, the CPU of the controller 25 reads the residual vibration signal e. The residual vibration signal e is stored as a time series data for each period To of the present output sampling clock SCo.

Then, the routine goes to a step 205. At the step 205, the CPU of the controller 25 resets to zero and starts two outputting and inputting timers to measure a period To of the output sampling clock SCo and to measure a period Ti of the input sampling clock SCi.

It is noted that outputting timers and inputting timers may be achieved in terms of a software by utilizing clock pulses in the controller 25 or may be achieved in terms of a hardware in the controller 25.

At a step 206, the CPU of the controller 25 determines whether the measured time of the outputting timer has reached to the period To.

If "No" at the step 206, the routine shown in FIG. 4 at the steps 207 through 209 are not executed but goes to a step 210.

At a step 210, the CPU of the controller 25 determines whether the measured time of the inputting timer has reached to the period Ti. If "No" at the step 210, the routine goes to a step 213 without passing through steps 211 and 212.

At the step 213, the CPU of the controller 25 determines whether the control variable j has reached to the division number of D of the sinusoidal wave.

If "YES" at the step 213, the routine goes to a step 214 in which the counter variable j is returned to "1" and the routine goes to a step 215.

If "NO" at the step 213, the routine goes to the step 215.

At the step 215, the CPU of the controller 25 determines whether a sufficient number of the residual vibration signal e has been read at a time at which the present period To has been added.

It is noted that the value set as the sufficient number of the residual vibration signal e may be equal to or more than the number in the case when the time required for the impulse response to sufficiently be damped divided by the period Ti since the transfer function C is derived as the impulse response.

However, since, at a later time, an FFT calculation is carried out for the fetched residual vibration signal e as the time-series sequence, it is desirable for the number of the fetched residual signal e to be a power of 2. In addition, it is also desirable for the value set as the sufficient number of the residual vibration signal e to be a minimum value from among the numerical value of the power of 2 exceeding the number in the case when the time required for the impulse response to sufficiently be damped which is divided by the period Ti since the extremely large amount of the residual vibration signal e to be read causes the read time to be longer and it takes a lot of time to calculate the FFT (Fast Fourier Transform).

For example, if the period Ti is 2 msec. And the time required for the impulse response to be sufficiently damped is 0.2 sec., 0.2 sec/2 sec=100. Hence, the numerical value set at the step 215 is 128 (e+=$2^7$=128).

If "NO" at the step 215, the routine returns to the step 206 in which the above-described processing through the steps 206 to 215 is repeated and executed.

Thereafter, since each numerical value of the above-described sequence is supplied sequentially one by one as the identification signal in synchronization with the output sampling clock SCo for the electromagnetic actuator 10 from the controller 25, the identification vibration in the sinusoidal waveform shape having a frequency determined according to the period To is developed. In addition, at the same time, the residual vibration signal e supplied form the load sensor 22 is read in synchronization with the inputted sampling clock SCi. The read residual vibration signal e is stored as the time-series (sequence) data.

If "YES" at the step 215, the routine goes to a step 216 in which a value which is a subtraction result of a predetermined unit time $\alpha_T$ from the period To is stored as a new period To of the output sampling clock SCo (To=To−$\alpha_T$). At the unit time $\alpha_T$ becomes small, the time required for the identification processing becomes long. Hence, the unit time $\alpha_T$ needs to be set with the calculation capability of the controller 25 in mind. For example, the unit time $\alpha_T$=0.2 msec.

Next, the routine goes to a step 217. The CPU of the controller 25 determines whether the period To of the output sampling clock SCo newly set at the step 216 is below the minimum value Tomin.

The minimum value Tomin is a period of a vibration having a highest frequency from among the vibrations to be the object of the vibration reduction control equally divided by D (the number of divisions of the sinusoidal wave, i.e., the number of the above-described sequences) and outputted as the identification signal. For example, if a maximum frequency of the vibration to be controllably reduced is 200 Hz and the number of divisions D of the above-described sequence is 8, the minimum value Tomin=(1/200)/8 seconds.

In addition, if "NO" at a step 217, the routine returns to the step 202 and the above-described processing through the steps 202 through 217 is repeated until "YES" at the step 217.

In details, since the series of processing through the steps 202 to 215 is executed whenever the period To varied by the unit time $\alpha_T$ between the maximum value Tomax and the minimum value Tomin is ended, the residual vibration signal e stored as the time-series sequence data according to the steps 210 and 211 is stored by the same number as the kinds of the period To.

When "YES" is resulted at the step 217, the routine goes to a step 218 in which the FFT calculation is carried out for each time-series (sequence) data of the residual vibration signal e stored for each period To to extract the frequency component for each time-series (sequence) data.

However, what is needed at the step 218 is only the component corresponding to the frequency of the original sinusoidal wave determined according to the corresponding period To but not the component of the whole frequencies for each time-series (sequence) data. Hence, at the step 218, the strict FFT calculation for each time-series sequence is not carried out but the FFT calculation may be carried out which is sufficient to determine a frequency component determined according to the period To corresponding to each time-series sequence.

After the required frequency component for each time-series sequence data has been determined at the step 218, the routine goes to a step 219.

At the step 219, an inverse FFT is calculated for the synthesized respective frequency components so as to transform them into an impulse response on a time axis.

Next, the routine goes to a step 220 in which an impulse response derived at a step 219 is stored as the transfer function filter C^. Upon the completion of the storage of the transfer function filter C^, the present identification processing of the transfer function C is ended.

FIGS. 5A, 5B, 5C, 5D, 5E and 5F show waveform diagrams to explain a whole stream of the identification processing of the transfer function C described above.

The identification signal having the quantized discrete value shown in FIG. 5A is supplied to the electromagnetic actuator 10.

The identification vibration which varies in the sinusoidal waveform shape shown in FIG. 5B is developed in the electromagnetic actuator 10. In this case, the period To which is an interval between one of the discrete values and the adjacent one thereof in the identification signal becomes gradually shorter as the frequency in the sinusoidal wave which is the original of the identification signal is raised. Hence, as the frequency of the sinusoidal wave becomes higher as shown in a right-handed waveform of FIG. 5A, an excessive roughness in a step-wise variation of the identification signal can be prevented. Consequently, as shown in FIG. 5B, the identification vibration having a smoothness extremely near to the original sinusoidal wave can be developed.

In details, when either or both of the period Ti or the period To are fixed, the interval of the discrete identification signal becomes coarse as the frequency of the sinusoidal signal is raised. In this case shown in FIG. 6A, the smooth identification vibration cannot be developed. However, as the result of processing shown in FIG. 4, the period To becomes short as the frequency of the original sinusoidal wave becomes raised. Consequently, such inconvenience as described above can be avoided.

In addition, since the sinusoidal wave which is the base of the identification signal is not determined through the calculation whenever the identification signal is prepared but is repeatedly outputted sequentially at the interval of the period To of the outputting sampling clock SCo with the sequence having the sinusoidal wave per period discretely stored within the memory. Hence, no increase in the calculation load nor in the memory capacity can be resulted.

If the identification vibration occurs, its response appears on the residual vibration signal as shown in FIG. 5C. The residual vibration signal supplied from the load sensor 22 is digitally converted into the controller 25 at an interval of the period Ti of the input sampling clock SCi as shown in FIG. 5D.

However, the period Ti is constant regardless of the frequency of the identification signal.

Figure 6A:
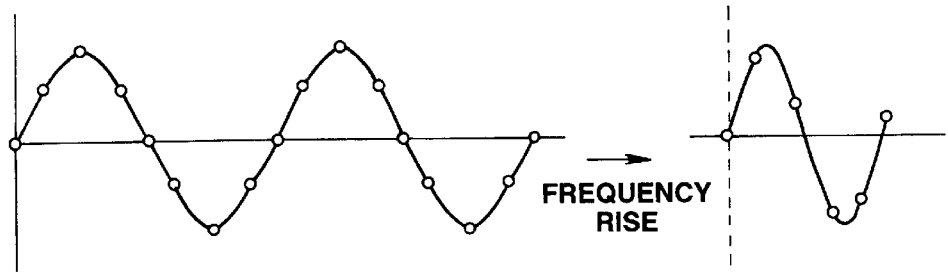
FIGS. 6A and 6B are explanatory views for explaining merits of capable of setting a period To and Ti individually.
Figure 6B:
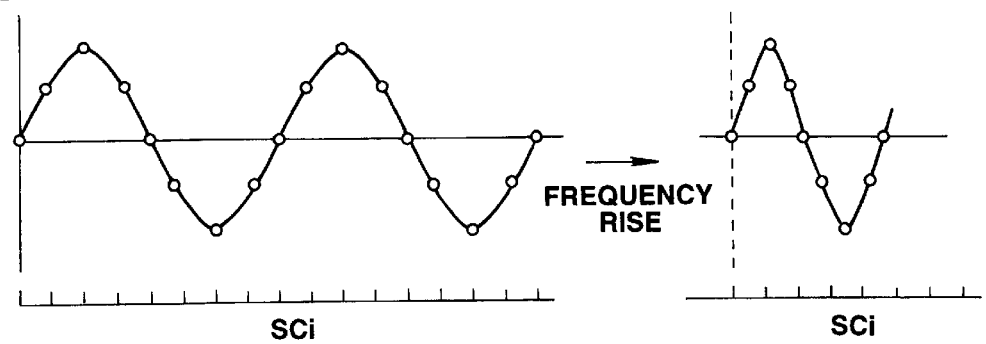
Figure 7:
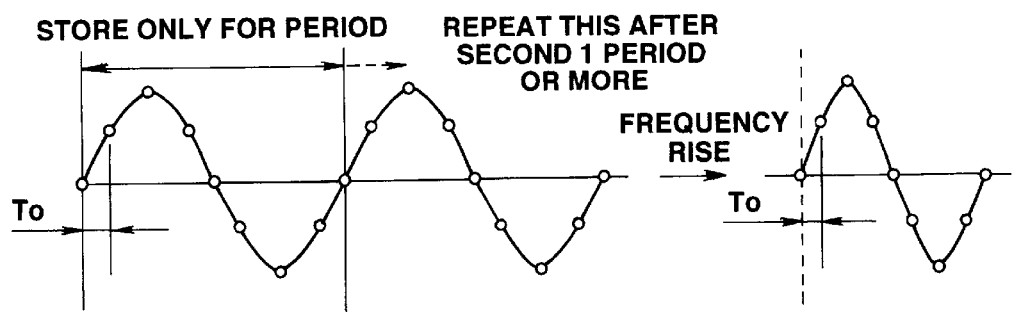
FIG. 7 is a waveform chart for explaining an output of the identification signal.

In details, both of the periods Ti and To are not positively and individually set as shown in FIG. 4. If the period Ti is variable together with the period To, the frequency of the identification signal becomes high so that the number of data on the residual vibration signal e stored as the time series (sequence) data in the ROM are increased. Consequently, the required memory capacity can remarkably be increased. However, in the first embodiment, as the result of execution of the routine in FIG. 4, the period To becomes short as the increase in the frequency but the period Ti is constant regardless of the variation of the frequency, as shown in FIG. 6B, no such inconvenience as described above can be resulted.

When the residual vibration signal is read as the time-series sequence data for each frequency as shown in FIG. 5D, the FFT is calculated for each time-series (sequence) data so that each frequency component of the original sinusoidal wave is extracted.

When each frequency component is synthesized, the discrete waveform shown in FIG. 5E is resulted.

When the inverse FFT is carried out for the synthesized result shown in FIG. 5E, the impulse response shown in FIG. 5F is resulted.

The results as shown in FIGS. 5E and 5F can be achieved even when the identification signal of the sinusoidal wave as described in the first embodiment is not developed, for example, can be achieved even when the identification signal caused by the white noise signal is developed.

Figure 8:
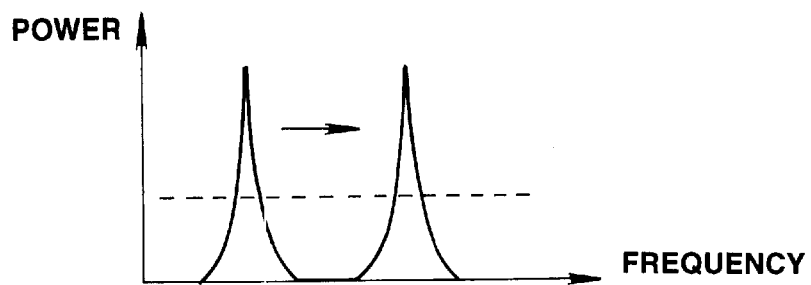
FIG. 8 is a frequency characteristic graph for explaining a difference when using a sinusoidal wave as the identification signal and using a white noise signal as the identification signal.

In a case where the identification vibration is developed with the white noise signal supplied to the electromagnetic actuator 10, the output of the identification vibration is dispersed over a wide frequency band as denoted by a dotted line of FIG. 8 so that each frequency component becomes extremely small.

In order to achieve the results shown in FIGS. 5E and 5F with a high accuracy, the adaptive calculation on the basis of the white noise signal and on the basis of the identification vibration developed according to the white noise signal is needed to be carried out for a relatively long period of time.

In the first embodiment using the identification signal developed on the basis of the sinusoidal wave, the output of the identification vibration is concentrated onto the particular frequency as denoted by a solid line of FIG. 8. Therefore, as the calculation time for each vibration frequency is not only shortened but also the whole calculation time is shortened as compared with the identification by means of the white noise signal.

Consequently, even in such a vehicle mounted controller 25 as having a relatively low capability and having little margin of the memory capacity thereof, the identification of the transfer function C can be carried out for a relatively short period of time.

Hence, for example, even when the identification processing of the transfer function C is carried out in response to the operation of the identification process start switch 28 in the final process of the manufacturing line, a large influence is not given on the vehicular manufacturing line speed (largely on a conveyer speed). Or, even if the identification process of the transfer function C is carried out with the identification process start switch 28 operated whenever a regular check at the car dealer is performed, a remarkable increase in a working hour can be avoided.

If the transfer function C is identified for each regular check, a variation in the vibration transmission system due to aging effects on each assembled part due to aging effects on each assembled part can be responded well. A favorable vibration reduction control can be executed.

A more specific discussion on the first embodiment described above will be made hereinbelow.

That is to say, if the maximum period Tomax and the minimum period Tomin of the period To of the outputted sampling clock SCo and the unit time $\alpha_T$ is Tomax=(⅕)/8 =25 msec., Tomin=(1/200)/8=0.625 msec., and $\alpha_T$=0.2 msec., the frequencies of the sinusoidal wave require 122 (kinds). If the period Ti of the input sampling clock SCi is 2 msec., the time required to fetch the residual vibration signal e is 2 (milliseconds)×128 (points)×122 (kinds)=31 (seconds).

In addition, if the unit time $\alpha_T$ which is a sampled period during the variation of the period To from the maximum value Tomax to the minimum value Tomin is made constant, the sampled period in the frequency is not made constant so that the FFT analysis to be carried out at the later time becomes troublesome.

From a theory of Fourier Transform, a frequency sampled period $\Delta f$ after the Fourier transform is $$\Delta f = 1/(\text{data duration time})$$
$$= 1/(2 \text{ milliseconds} \times 128 \text{(points)}) = 3.9 \text{ Hz}.$$

Thus, it is desirable for the frequency sampled period to be conformed to 3.9 Hz.

It is noted that if the minimum frequency fmin of the outputted sampling clock SCo and the maximum frequency fmax thereof are fmin=3.9 Hz×2=7.8 Hz and fmax=3.9 Hz ×52=203 Hz, Tomax=16 milliseconds and Tomin=0.616 milliseconds.

In addition, the time required to fetch the residual vibration signal e is 2 (milliseconds)×128 (points)×51 (kinds)= 13.3 (seconds).

Consequently, a remarkable shortening can be achieved as compared with the case where the unit time $\alpha_T$ is not made constant, the constant unit time αT is not used for the decrement of the period To as in the step 216 of FIG. 4. The value of the period To previously stored in the form of a table with respect to the frequency and the CPU of the controller 25 reads the value of To from the stored table.

It is noted that since, in the first embodiment, the load sensor 22 is used to detect the vibration transmitted from the active engine mount 1 toward the vehicle body 35 the residual vibration e representing accurately a magnitude of the vibration amplitudes can be supplied to the controller 25.

Hence, the controller 25 can develop and output the drive signal y which reflects accurately on the magnitude of the amplitude of the vibration applied to the active engine mount 1 so that the electromagnetic actuator 10 can displace the movable plate 12 with an amplitude proportional to the vibration applied to the active engine mount 1. Hence, the favorable vibration reduction control can be achieved over the whole frequency band from the idling vibration (20 to 30 Hz) to the enclosed sound vibration (80 to 800 Hz).

Since, in addition, the load sensor 22 is incorporated into the active engine mount 1 and a tightening force of the bolt 9 is not applied to the load sensor 22, a load withstanding condition established on the load sensor 22 can be lowered. Therefore, a small-sized load sensor can be adopted as the load sensor 22. Consequently, it is very suitable for such an active engine mount 1 as having a little margin against its mounting space and it is costly effective. Since the load sensor 22 is integrally incorporated into the active engine mount 1, a labor cost of actually mounting the active engine mount 1 on the vehicle can be reduced so that an efficiency of the vehicle manufacturing line can be improved.

In the first embodiment described above, the vehicular engine 30 corresponds generally to a vibration source, the active engine mount 1 corresponds generally to a controlled vibration source, the pulse signal generator 26 corresponds generally to reference signal developing means, the load sensor 22 corresponds generally to residual vibration detecting means, the routine shown in FIG. 3 corresponds generally to active vibration controlling means, the steps 201 to 203, the steps 207,208, 209, 213 to 215, and the step 217 shown in FIG. 4 correspond generally to identification signal supplying means, the step 204 and the step 211 shown in FIG. 4 correspond generally to response signal reading means, the steps 218 and 219 shown in FIG. 4 correspond generally to individual period setting means, the step 216 shown in FIG. 4 corresponds generally to output period varying means, the non-volatile memory in the controller 25 corresponds to memory means, the step 218 shown in FIG. 4 corresponds generally to Fourier transforming means, the step 219 shown in FIG. 4 corresponds generally to inverse Fourier transforming means, the step 102 shown in FIG. 3 corresponds to updating reference signal developing means, and the step 107 shown in FIG. 3 corresponds generally to filter coefficient updating means.

Second Embodiment

FIGS. 9A through 12B show explanatory views for explaining a second preferred embodiment of the active vibration reducing apparatus according to the present invention. It is noted that since the whole structure and the content of processing in the second embodiment are generally the same as those described in the first embodiment shown in FIGS. 1A through 8, the detailed description thereof will be omitted. Main difference points in the second embodiment will therefore be described below.

As described in the first embodiment, the period To of the outputting the sampling clock SCo is varied with the period Ti of the inputting sampling clock SCi fixed.

Figure 9A:
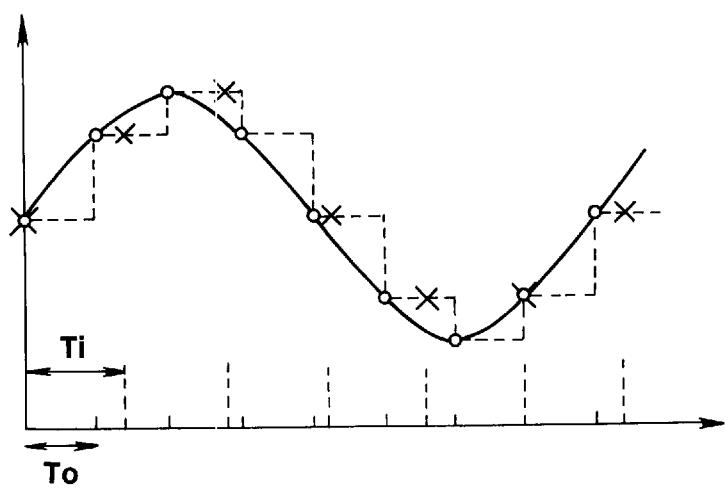
FIGS. 9A and 9B are waveform charts for explaining a phase delay inherently included in a residual vibration signal.
Figure 9B:
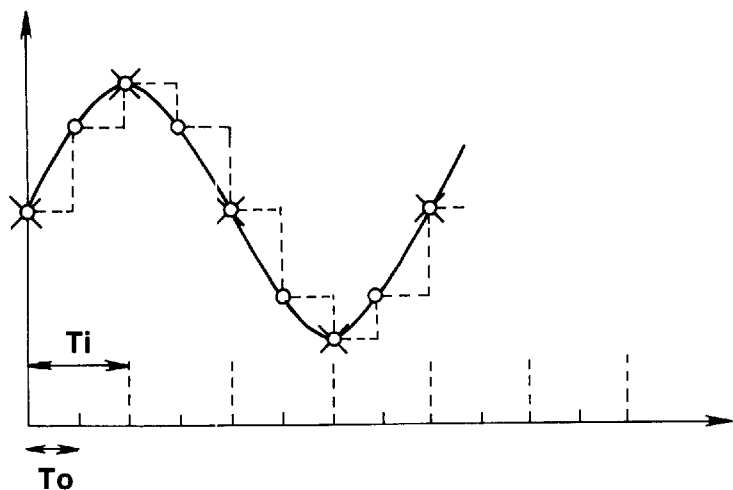

At this time, such two cases as described below occur: 1) the period Ti does not indicate the multiplied value of the period To which is multiplied by an integer (Similarly, the period To does not indicate the multiplied value of the period Ti which is multiplied by the integer) as shown in FIG. 9A; and 2) the period Ti exactly indicates the multiplied value of the period Ti which is multiplied by the integer as shown in FIG. 9B.

In the latter case, as each of the outputting timings of the identification signal is denoted by mark ○ and each of the read timings of the identification signal is denoted by X, these timings are coincident with each other on a time axis (lateral axis) of FIG. 9B. A phase characteristic in a vibration transmission system achieved on the basis of the residual vibration signal is dependent only on its vibration transmission system.

However, in the former case, deviations between those timings of outputting the identification signal and of reading the residual vibration signal occur on the time axis, as shown by the mark ○ and the mark X of FIG. 9B in the same way as shown in FIG. 9A.

Then, the identification signal is, in other words, a set of discrete values. Hence, while one of the discrete values is outputted and, thereafter, the subsequent one of the discrete values is outputted, the identification signal is held at a constant value.

Hence, a phase delay (lag) is included in the residual vibration signal, irrespective of the characteristic of the vibration transmission system. Without compensation for the phase lag, the phase delay characteristic reflects on the transfer function C so that an accuracy of the transfer function C is accordingly reduced.

In addition, a magnitude of the phase delay is different according to the magnitude of the period To (More precisely, a remainder when the period Ti is divided by the period To or a remainder when the period To is divided by the period Ti).

For such a phase delay as described above, calculations such as providing individual phase advances for the respective time sequence (series) data of the residual vibration signal may be carried out before the execution of the step 218 in FIG. 4 in the case of, for example, the first embodiment.

However, the time duration for the calculations described above is accordingly elongated.

This is not advantageous.

In the second embodiment, a plurality of the sequences are stored in the non-volatile memory such as the ROM shown in FIG. 21B within the controller 25 for the respective frequencies and a phase advance (θ) is previously included in the original sinusoidal waveform to develop these respective sequences according to the period To of the previously corresponding output sampling clock SCo. Hence, the phase lag described above can be canceled.

In details, in the second embodiment, the original sinusoidal waveform in which the phase advance (θ) is previously provided according to the period To of the corresponding output sampling clock SCo is divided at the equal intervals so as to develop the respective sequences.

Figure 10:
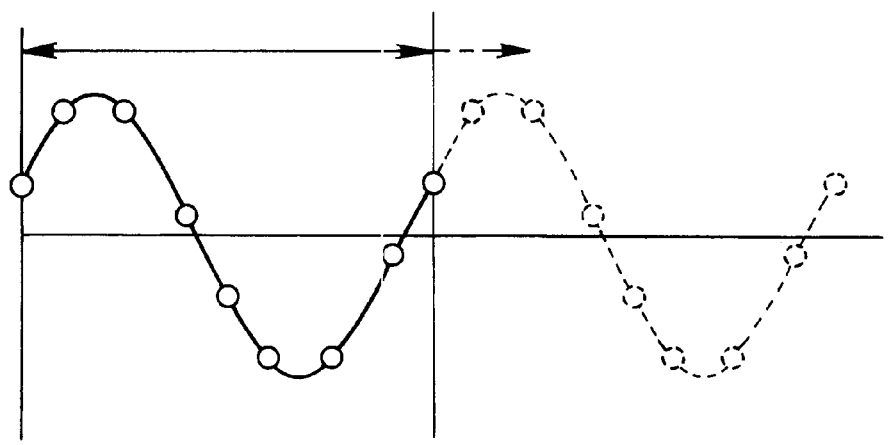
FIG. 10 is a waveform chart for explaining an output of the identification signal in a second preferred embodiment of he actively vibration reducing apparatus according t the present invention.

The developed respective sequences (time series data) are stored in the non-volatile memory (ROM in FIG. 1B). During the execution of the identification processing, the respective sequences are selected one by one. Then, each numerical value of the selected sequences is sequentially and iteratively outputted as the identification signal in synchronization with the corresponding output sampling clock SCo as shown in FIG. 10.

At this time, the phase advance (θ) is given to the developed identification vibration. Consequently, the phase delay included in the residual vibration signal can be canceled in a case where the above-described period Ti is not equal to the multiplied value of the period To by its integer.

Figure 11:
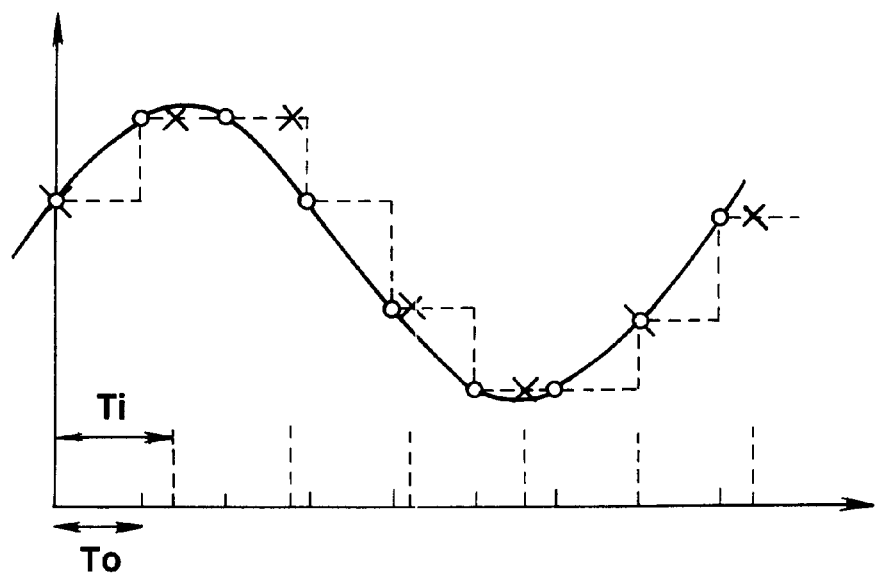
FIG. 11 is a waveform chart for explaining a result of the dentification of thef ransfer function executed in the second embodiment

FIG. 11 shows the developed state of the identification signal and the read state of the residual vibration signal when the phase advance such that the phase delay included in the later read residual vibration signal can be canceled is given to the original sinusoidal wave of the identification signal, the periods To and Ti being under the same condition as in the case of FIG. 9A.

Consequently, since the phase delay included in the residual vibration signal and irrespective of the vibration transmission system can be eliminated, the identification of the transfer function C can be identified.

In addition, since the increase in the calculation load in the case where the identification processing is actually carried out is not resulted, the time duration in the calculation cannot be increased.

FIG. 12A shows the identification signal when no phase advance is given to the sinusoidal wave.

FIG. 12B shows the identification signal when the phase advance by 10 degrees is given to the sinusoidal wave.

Specifically, if one period is divided into eight segments, a table of the sequences stored in the non-volatile memory gives as follows in the case of no phase advance given as FIG. 12A.

$\sin(2\pi \times 0/8) = 0$ $\sin(2\pi \times 1/8) = 0.707$ $\sin(2\pi \times 2/8) = 1$ $\sin(2\pi \times 3/8) = 0.707$ $\sin(2\pi \times 4/8) = 0$ $\sin(2\pi \times 5/8) = 0.707$ $\sin(2\pi \times 6/8) = -1$ $\sin(2\pi \times 7/8) = -0.707$ On the other hand, if the phase advance by 10 degrees is given as shown in FIG. 12B.

$\sin(2\pi \times 0/8 + 10\pi/180) = 0.174$ $\sin(2\pi \times 1/8 + 10\pi/180) = 0.819$ $\sin(2\pi \times 2/8 + 10\pi/180) = 0.984$ $\sin(2\pi \times 3/8 + 10\pi/180) = 0.574$ $\sin(2\pi \times 4/8 + 10\pi/180) = -0.174$ $\sin(2\pi \times 5/8 + 10\pi/180) = -0.819$ $\sin(2\pi \times 6/8 + 10\pi/180) = -0.984$ $\sin(2\pi \times 7/8 + 10\pi/180) = -0.574$ The phase delay is previously measured through a simulation in which the identification signal is developed under no phase advance given to the original sinusoidal wave of the identification signal and the identification vibration developed according to the identification signal is read as the residual vibration signal.

Then, the phase advance ($\theta$) having the same magnitude as the measured phase delay ($-\theta$) may be used.

It is noted that since the phase delay included in the residual vibration signal is not related to the characteristic of the vibration transmission system but dependent upon only the periods Ti and To, it is not necessary to measure it for each vehicle in which the vibration actively reducing apparatus according to the present invention is to be mounted.

Third Embodiment

Figure 13:
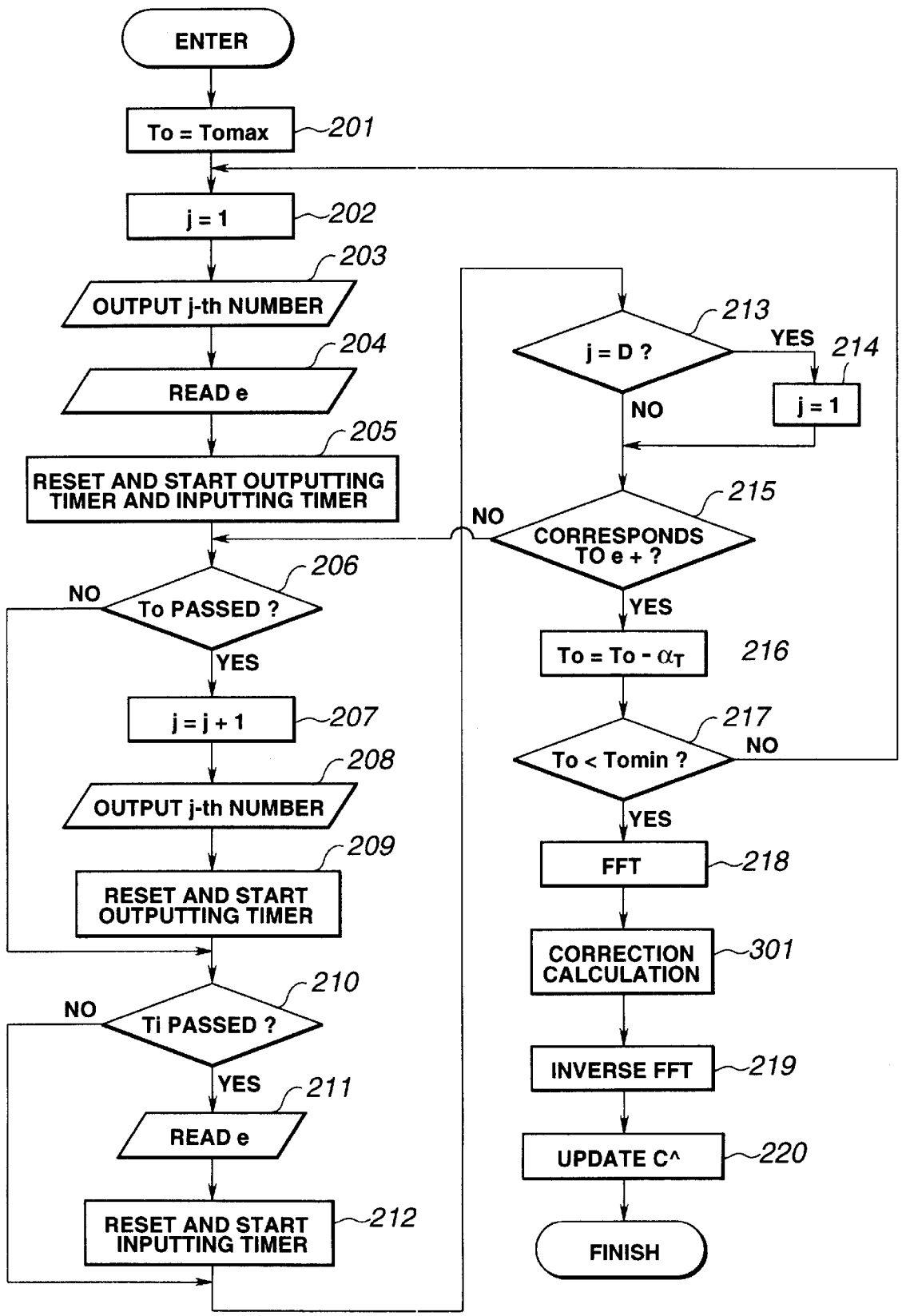
FIG. 13 is an operational flowchart for explaining a concept of the identification processing in a third preferred embodiment of the actively vibration reducing apparatus.

FIGS. 13 and 14 show a third preferred embodiment of the vibration actively reducing apparatus according to the present invention.

FIG. 13 is, particularly, an operational flowchart of identification processing executed within the controller 25 in the same way as that shown in FIG. 4 of the third embodiment.

The same reference numerals shown in FIG. 13 designate like steps shown in FIG. 4. Hence, the detailed description of the same steps shown in FIG. 13 will be omitted herein. The whole structure of the actively vibration reducing apparatus in the third embodiment is the same as that in the first embodiment.

That is to say, in the third embodiment, an amplitude (A) of the original sinusoidal wave for the identification signal is variable according to its frequency, although, in the previous first and second embodiments, a special discussion on the amplitude of the sinusoidal wave which is the original of the identification signal is not made.

Specifically, as shown in FIG. 14, as the amplitude (A) of the sinusoidal wave becomes larger as the frequency becomes lower, when the frequency is increased and exceeds 50 Hz, the amplitude thereof (A) becomes gradually reduced, and the amplitude thereof (A) is constant after the amplitude thereof becomes reduced to some degree.

Since the vibration level developed in the vehicular engine 30 is, generally, large at the relatively high frequency range, it is desirable for the amplitude of the identification signal to be needed to be coincident with each of the amplitudes for the respective vibration frequencies developed in the vehicular engine 30.

It is noted that when the sequence which serves as the identification signal is read from the non-volatile memory within the controller 25, its amplitude of the read sequence may be adjusted. Or alternatively, with the plurality of sequences stored on the basis of the plurality of sinusoidal wave having different amplitudes, the sequences are individually used for the respective frequency ranges so that the identification signals whose amplitudes are individually and separately set according to the frequency are used for the identification processing.

However, since, when a difference in an amplitude of the original sinusoidal wave is included in the transfer function C finally determined as if the difference in the amplitude were the characteristic of the vibration transmission system, it is necessary to correct it.

Hence, in FIG. 13, the routine goes to the step 218 to a step 301 in which a magnitude of each frequency component is corrected. The correction calculation carried out at the step 301 is, specifically, such that each one of the frequency components is divided by the amplitude of the corresponding one of the sinusoidal waves. For example, if the amplitude of the sinusoidal wave to be referenced is 1 and the amplitude of the corresponding one of the sinusoidal waves with respect to a certain frequency component is 0.5, its frequency component is divided by 0.5 (twice). Then, upon the end of the correction calculation at the step 301, the processes at the steps 219 and 220 are executed.

In the third embodiment, since the transfer function C representing more accurately the characteristic of the actual vibration transmission system can be identified, the more favorable vibration reduction control can be achieved. In this third embodiment, the step 301 of FIG. 13 corresponds to correcting means.

It is noted that in each of the first, second, and third embodiments, the residual vibration is detected by means of the load sensor 22 which is built in the active engine mount 1. For example, an acceleration sensor (or called accelerator) may be disposed on a vehicular occupant's foot corresponding position within a passenger compartment of the vehicle to output a vehicular acceleration signal as the residual vibration signal e.

It is noted that the present invention is applicable to the vibration actively reducing apparatus to reduce the vibration developed from the vibration (developing) source except the vehicular engine 30, for example, to an apparatus for actively reducing the vibration from a machine tool to a floor thereof or compartment in which the machine tool is installed.

Furthermore, although the synchronous-type Filtered-X LMS algorithm is applied as an adaptive algorithm to develop the drive signal y in each of the first, second, and third embodiments, a normal-type Filtered-X LMS algorithm may be used.

In the first embodiment, the maximum frequency of the sinusoidal wave which is the original of the identification signal is set to 200 Hz.

A reason of deriving 200 Hz as the maximum frequency is that, in a generally available reciprocating four-cylinder engine, the engine vibration in a second-order harmonic component of the engine revolution is a problematic vibration to be reduced.

Hence, since an maximum revolution per minute of the engine may generally be 6000 (rpm), the second-order harmonic component of the engine revolution is turned to give 200 Hz. Hence, the maximum frequency of the sinusoidal wave which is the original of the identification signal may properly be selected according to a model of the engine.

In the third embodiment, as shown in FIG. 14, the amplitude of the sinusoidal wave which is the original (analog) form of the digital identification signal becomes large with 50 Hz as a boundary. The reason of deriving 50 Hz is that, in the generally available reciprocating four-cylinder engine, a large vibration occurs in an engine idling frequency band equal to or below 1500 rpm. Hence, 50 Hz which is the second-order component of the engine revolution of 1500 rpm ($1500 \geqq 60=25$, $25\times 2=50$) is the boundary described above.

Such a boundary frequency as 50 Hz may properly be set according to the model of the engine.

It is noted that the FFT calculation (analyzer) and the inverse FFT calculation (analyzer) described at the steps of 218 and 219 shown in FIGS. 4 and 13 are exemplified by a U.S. Pat. No. 5,537,435 issued on Jul. 16, 1996 (, the disclosure of which is herein incorporated by reference).

It is also noted that the sinusoidal wave can generally be expressed as $f=A \sin (2\pi ft \pm \theta)$ and each discrete value of the sinusoidal wave per period can generally be expressed as $f=f_1, f_2, ---, f_j, ---, f_D$.

What is claimed is:

1. An apparatus for actively reducing a vibration, comprising:

a vibration developing source;

a controlled vibration source arranged so as to be enabled to develop a controlled vibration to be interfered against the vibration developed from the vibration developing source;

a reference signal generator for detecting a vibration developed condition of the vibration developing source and generating and outputting the detected vibration developed condition as a reference signal;

a residual vibration detector for detecting a residual vibration after the interference of the controlled vibration against the vibration developed from the vibration developing source;

a controller for driving the controlled vibration source to reduce the vibration developed from the vibration developing source using a control algorithm including a transfer function established between the controlled vibration source and the residual vibration detector on the basis of the reference signal and the residual vibration signal;

an identification signal supplier for sequentially supplying individual discrete values of an identification signal which is a quantization of a time-continuous sinusoidal wave equally divided by a predetermined number to the controlled vibration source in synchronization with a predetermined output sampling clock;

a response signal reader for reading the residual vibration signal in synchronization with a predetermined input sampling clock when an identification vibration responding to the identification signal is developed from the controlled vibration source;

a transfer function identifier for identifying the transfer function included in the control algorithm on the basis of the residual vibration signal read by the response signal reader; and a period setter capable of setting individually and independently periods of the predetermined output and input sampling clocks.

2. An apparatus for actively reducing a vibration as claimed in claim 1, wherein the sinusoidal wave comprises a plurality of sinusoidal waves, each one of the sinusoidal waves having a different frequency from any other sinusoidal waves and wherein the identification signal supplier selects the sinusoidal waves one by one and sequentially supplies each of the individual discrete values of the selected one of the sinusoidal waves as the identification signal to the controlled vibration source.

3. An apparatus for actively reducing a vibration as claimed in claim 2, wherein said period setter comprises an output sampling clock period variable setter for varying a period of the predetermined output sampling clock so as to provide a plurality of predetermined output sampling clocks, each predetermined output sampling clock having one of the varied periods, according to an individual one of frequencies that the sinusoidal waves each of which serves as an original of the identification signal have.

4. An apparatus for actively reducing a vibration as claimed in claim 3, wherein the output period variable setter varies the period of the predetermined sampling clock such that as the one of the frequencies of the sinusoidal waves which serves as the original of the identification signal becomes increased, the period of the predetermined sampling clock becomes short.

5. An apparatus for actively reducing a vibration as claimed in claim 4, wherein the identification supplier comprises a memory for storing a plurality of time series data, each time series data being the quantization of the corresponding one of the sinusoidal waves equally divided by the predetermined number (D) and wherein the identification signal supplier sequentially supplies each numerical value of one of the time series data as each discrete value of the identification signal to the controlled vibration source in synchronization with the predetermined output sampling clock.

6. An apparatus for actively reducing a vibration as claimed in claim 2, wherein each sinusoidal wave has an individual phase advance (θ), the phase advance being previously set in accordance with a corresponding one of the predetermined output sampling clocks in synchronization of which the individual discrete values of the corresponding one of the sinusoidal waves are sequentially supplied to the controlled vibration source.

7. An apparatus for actively reducing a vibration as claimed in claim 6, wherein the identification signal supplier comprises a memory for storing a plurality of time series data, each of the time series data being a quantization of the corresponding one of the sinusoidal waves equally divided by the predetermined number (D) to which the individual phase advance is given according to a corresponding one of the periods of the predetermined output sampling clocks, and wherein the identification supplier selects the plurality of the time series data one by one and sequentially supplies each one of the individual discrete values of the selected time series data as each discrete value of the identification signal to the controlled vibration source in synchronization with one of the predetermined output sampling clocks which corresponds to the selected time series data.

8. An apparatus for actively reducing a vibration as claimed in claim 7, wherein each sinusoidal wave has an amplitude (A) individually set according to its frequency of the sinusoidal wave.

9. An apparatus for actively reducing a vibration as claimed in claim 7, wherein the transfer function identifier comprises: a Fourier transform calculator for performing a Fourier transform of the residual vibration signal read by the response signal reader whenever the identification signal supplies the individual discrete values of each different sinusoidal waves to extract a component of the frequency of each different sinusoidal wave; and an inverse Fourier transform calculator for performing an inverse Fourier transform of a synthesized data of the frequency components extracted by the Fourier transform calculator to derive an impulse response as the transfer function.

10. An apparatus for actively reducing a vibration as claimed in claim 8, wherein each amplitude of the sinusoidal waves becomes small as each of the frequencies of the sinusoidal waves becomes raised.

11. An apparatus for actively reducing a vibration as claimed in claim 10, wherein the transfer function identifier comprises: a Fourier transform calculator for performing a Fourier transform of the residual vibration signal read by the response signal reader whenever the identification signal supplies the individual discrete values of each different sinusoidal waves to extract a component of the frequency of each different sinusoidal wave; a corrector for correcting each frequency component extracted by the Fourier transform calculator according to the amplitude of each corresponding one of the sinusoidal waves; and an inverse Fourier transform calculator for performing an inverse Fourier transform of a synthesized data of the frequency components extracted by the Fourier transform calculator and corrected by the corrector to derive an impulse response as the transfer function.

12. An apparatus for actively reducing a vibration as claimed in claim 11, which further comprises a memory for updating and storing the impulse response derived by the inverse Fourier transform calculator as a new transfer function ($C^\wedge$) established between the controlled vibration source and the residual vibration detector.

13. An apparatus for actively reducing a vibration as claimed in claim 12, wherein the controller comprises an adaptive digital filter having a plurality of variable filter coefficients; a drive signal generator for filtering the reference signal from the reference signal generator to generate and output a drive signal to derive the controlled vibration source; an updating reference signal calculator for calculating an updating reference signal ($R^T$) which is a result of a response to an inputting of the reference signal to the transfer function; and a filter coefficient updating circuit for updating the filter coefficients of the adaptive digital filter in accordance with a sequential updating type adaptive algorithm constituting the control algorithm on the basis of the residual vibration signal and the updating reference signal.

14. An apparatus for actively reducing a vibration as claimed in claim 13, wherein the controlled vibration source constitutes an electromagnetic actuator installed within an active engine mount interposed between a vehicular engine as the vibration developing source and a vehicle body and the vibration signal detector comprises a load sensor installed in the active engine mount between the electromagnetic actuator and the vehicle body.

15. An apparatus for actively reducing a vibration as claimed in claim 14, which further comprises an identification process start switch for operatively turning on operations of the identification signal supplier, the response signal reader, the transfer function identifier, and the period setter, each thereof being installed within the controller.

16. An apparatus for actively reducing a vibration as claimed in claim 15, wherein an updating equation of the variable filter coefficients $Wi$ ($i=0, 1, 2, ---, I-1$, wherein I denotes a number of taps in the adaptive digital filter) is expressed as: $Wi(n+1)=Wi(n)-\mu R^T e(n)$, wherein terms attached with (n) and (n+1) are values of the filter coefficients at sampling times of (n) and (n+1), $\mu$ denotes a convergence coefficient, and the updating reference signal ($R^T$) denotes a value filtered by a transfer function filter ($C^\wedge$) which is a model of an infinite impulse response type filter of the transfer function (C) established between the electromagnetic actuator and the load sensor.

17. An apparatus for actively reducing a vibration as claimed in claim 16, wherein the equally divided number (D) of each sinusoidal wave is $2^3$, the period of the predetermined output sampling clock is varied from a maximum value (Tomax) of 1/5/8 seconds (=25 milliseconds) to a minimum value (Tomin) of 1/20/8 seconds (=0.625 milliseconds) for each unit time $\alpha_T$ of 0.2 milliseconds, and the period of the predetermined input sampling clock is 2 milliseconds.

18. An apparatus for actively reducing a vibration as claimed in claim 16, wherein the response signal reader comprises a counter for counting a read number of the residual vibration signals (e) in synchronization with the predetermined input sampling clock (SCi) when the identification vibration is developed from the controlled vibration source and for determining whether the read number of the residual vibration signals have been reached to a predetermined number (e+).

19. An apparatus for actively reducing a vibration as claimed in claim 18, wherein the Fourier transform calculator comprises an FFT analyzer and the inverse Fourier transform calculator comprises an inverse FFT analyzer.

20. An apparatus for actively reducing a vibration as claimed in claim 19, wherein the equally divided number (D) of each sinusoidal wave is $2^3$ (=8), the period (To) of the predetermined output sampling clock is varied from a maximum value (Tomax) of 16 milliseconds to a minimum value (Tomin) of 0.616 milliseconds, the number of the sinusoidal waves is 51, the predetermined number of the read residual vibration signals in the response signal reader are $2^7$ (=128), and the period (Ti) of the predetermined output sampling clock is 0.2 milliseconds.

21. An apparatus for actively reducing a vibration as claimed in claim 20, wherein each amplitude of the sinusoidal waves becomes gradually small as each of the frequencies of the sinusoidal waves becomes raised with approximately 50 Hz as a boundary and each amplitude thereof is constantly large as each of the sinusoidal waves becomes reduced with approximately 50 Hz as the boundary.

22. An apparatus for actively reducing a vibration as claimed in claim 20, wherein the phase advance is approximately 10 degrees.

23. An apparatus for actively reducing a vibration, comprising:

vibration developing source means;

controlled vibration source means arranged so as to be enabled to develop a controlled vibration to be interfered against the vibration developed from the vibration developing source means;

reference signal generating means for detecting a vibration developed condition of the vibration developing source means and generating and outputting the detected vibration developed condition as a reference signal;

residual vibration detecting means for detecting a residual vibration after the interference of the controlled vibration against the vibration developed from the vibration developing source means;

controlling means for driving the controlled vibration source means to reduce the vibration developed from the vibration developing source means using a control algorithm including a transfer function established between the controlled vibration source means and the residual vibration detecting means on the basis of the reference signal and the residual vibration signal;

identification signal supplying means for sequentially supplying individual discrete values of an identification signal which is a quantization of a time-continuous sinusoidal wave equally divided by a predetermined number to the controlled vibration source in synchronization with a predetermined output sampling clock;

response signal reading means for reading the residual vibration signal in synchronization with a predetermined input sampling clock when an identification vibration responding to the identification signal is developed from the controlled vibration source means;

transfer function identifying means for identifying the transfer function included in the control algorithm on the basis of the residual vibration signal read by the response signal reading means; and period setting means capable of setting individually and independently periods of the predetermined output and input sampling clocks.

24. A method for identifying a transfer function in a vibration actively reducing apparatus, the vibration actively reducing apparatus comprising:

a vibration developing source;

a controlled vibration source arranged so as to be enabled to develop a controlled vibration to be interfered against the vibration developed from the vibration developing source;

a reference signal generator for detecting a vibration developed condition of the vibration developing source and generating and outputting the detected vibration developed condition as a reference signal;

a residual vibration detector for detecting a residual vibration after the interference of the controlled vibration against the vibration developed from the vibration developing source; and a controller for driving the controlled vibration source to reduce the vibration developed from the vibration developing source using a control algorithm including a transfer function established between the controlled vibration source and the residual vibration detector on the basis of the reference signal and the residual vibration signal, the method comprising the steps of:
  a) setting individually and independently periods of predetermined output and input sampling clocks;
  b) sequentially supplying individual discrete values of an identification signal which is a quantization of a time-continuous sinusoidal wave equally divided by a predetermined number to the controlled vibration source in synchronization with the predetermined output sampling clock;
  c) reading the residual vibration signal in synchronization with the predetermined input sampling clock when an identification vibration responding to the identification signal is developed from the controlled vibration source; and
  d) identifying the transfer function included in the control algorithm on the basis of the residual vibration signal read at the step c).

* * * * *

UNITED STATES PATENT AND TRADEMARK OFFICE
CERTIFICATE OF CORRECTION

PATENT NO.   : 6,018,689
DATED        : January 25, 2000
INVENTOR(S)  : Takeshi Kimura, et al.

It is certified that error appears in the above-identified patent and that said Letters Patent is hereby corrected as shown below:

<u>Title page,</u>
Section [75], change the first inventor's name from "Takeshi Kumura" to -- Takeshi Kimura --.

Signed and Sealed this

Ninth Day of October, 2001

*Attest:*

*Nicholas P. Godici*

NICHOLAS P. GODICI
*Attesting Officer*  *Acting Director of the United States Patent and Trademark Office*